US010715600B2

(12) United States Patent
Sasaki et al.

(10) Patent No.: US 10,715,600 B2
(45) Date of Patent: Jul. 14, 2020

(54) NETWORK HUB, TRANSFER METHOD, AND ONBOARD NETWORK SYSTEM

(71) Applicant: Panasonic Intellectual Property Corporation of America, Torrance, CA (US)

(72) Inventors: Takamitsu Sasaki, Osaka (JP); Tomoyuki Haga, Nara (JP); Manabu Maeda, Osaka (JP); Hideki Matsushima, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 88 days.

(21) Appl. No.: 16/188,330

(22) Filed: Nov. 13, 2018

(65) Prior Publication Data

US 2019/0082016 A1 Mar. 14, 2019

Related U.S. Application Data

(63) Continuation of application No. PCT/JP2017/015818, filed on Apr. 20, 2017.

(Continued)

(30) Foreign Application Priority Data

Mar. 27, 2017 (JP) ................................ 2017-061914

(51) Int. Cl.
*H04L 29/08* (2006.01)
*H04L 12/46* (2006.01)
(Continued)

(52) U.S. Cl.
CPC .............. *H04L 67/12* (2013.01); *H04L 12/40* (2013.01); *H04L 12/407* (2013.01); *H04L 12/46* (2013.01);
(Continued)

(58) Field of Classification Search
None
See application file for complete search history.

(56) References Cited

U.S. PATENT DOCUMENTS 6,205,486 B1* 3/2001 Wei .................... H04L 12/66
370/414
7,242,692 B2* 7/2007 Wu ..................... H04L 47/6215
370/230.1

(Continued)

FOREIGN PATENT DOCUMENTS

JP 2008-205913 9/2008
JP 2013-123998 6/2013
(Continued)

OTHER PUBLICATIONS

The Extended European Search Report from the European Patent Office (EPO) dated Feb. 22, 2019 for Europea Patent Application No. 17802504.5.
International Search Report of PCT application No. PCT/JP2017/015818 dated Jul. 25, 2017.

*Primary Examiner* — Brian S Roberts
(74) *Attorney, Agent, or Firm* — Greenblum & Bernstein, P.L.C.

(57) ABSTRACT

A hub is connected to first and second networks where first-type and second-type frames are transmitted following first and second communication protocols. The hub sequentially receives each of the first-type and second-type frames, and stores data in first and second reception buffers. If the destination of data stored in the first and second reception buffers is the first network, the hub stores the data in a first transmission buffer. If the destination is the second network, the hub stores the data in a second transmission buffer. If the first transmission buffer is a priority transmission buffer, the hub transmits first yet-to-be-transmitted data in the first transmission buffer with priority. If the second transmission
(Continued)

buffer is the priority transmission buffer, the hub transmits second yet-to-be-transmitted data in the second transmission buffer with priority.

18 Claims, 23 Drawing Sheets

Related U.S. Application Data

(60) Provisional application No. 62/342,528, filed on May 27, 2016.

(51) Int. Cl.
   *H04L 12/407* (2006.01)
   *H04L 12/40* (2006.01)
   *H04L 12/24* (2006.01)
   *H04L 29/06* (2006.01)

(52) U.S. Cl.
   CPC ...... *H04L 12/4625* (2013.01); *H04L 41/0806* (2013.01); *H04L 67/322* (2013.01); *H04L 69/18* (2013.01); *H04L 2012/40215* (2013.01); *H04L 2012/40273* (2013.01)

(56) References Cited

U.S. PATENT DOCUMENTS

| | | | | |
|---|---|---|---|---|
| 7,787,479 | B2* | 8/2010 | Matsuo | H04L 12/4135 370/401 |
| 9,294,590 | B2* | 3/2016 | Hwang | H04L 69/08 |
| 10,021,041 | B2* | 7/2018 | Yousefi | B60R 16/03 |
| 2005/0281277 | A1* | 12/2005 | Killian | H04L 45/22 370/412 |
| 2011/0167147 | A1* | 7/2011 | Andersson | H04L 43/0858 709/224 |
| 2013/0073764 | A1* | 3/2013 | Deb | H04L 12/66 710/241 |
| 2013/0159466 | A1 | 6/2013 | Mao | |
| 2013/0204466 | A1* | 8/2013 | Ricci | G06F 17/00 701/2 |
| 2014/0023068 | A1* | 1/2014 | Kim | H04L 45/72 370/355 |
| 2015/0003443 | A1 | 1/2015 | Koenigseder et al. | |
| 2016/0080533 | A1* | 3/2016 | Jeon | H04L 12/6418 370/402 |
| 2016/0294707 | A1* | 10/2016 | Chen | H04L 47/24 |

FOREIGN PATENT DOCUMENTS

| | | |
|---|---|---|
| JP | 2015-207814 | 11/2015 |
| JP | 2016-111477 | 6/2016 |

* cited by examiner

FIG. 3A

| SOF | ID FIELD (CAN-ID) | RTR | IDE | r | DLC (SIZE) | DATA FIELD (DATA) | CRC | DEL | ACK | DEL | EOF |
|---|---|---|---|---|---|---|---|---|---|---|---|
| 1 | 11 | 1 | 1 | 1 | 4 | 0 TO 64 | 15 | 1 | 1 | 1 | 7 |

FIG. 3B

| SOF | ID FIELD (PART OF CAN-ID) | SRR | IDE | EXTENDED ID (REMAINING PART OF CAN-ID) | RTR | r1 | r0 | DLC (SIZE) | DATA FIELD (DATA) | CRC |
|---|---|---|---|---|---|---|---|---|---|---|
| 1 | 11 | 1 | 1 | 18 | 1 | 1 | 1 | 4 | 0 TO 512 | 17/21 |

RECESSIVE / DOMINANT

FIG. 4
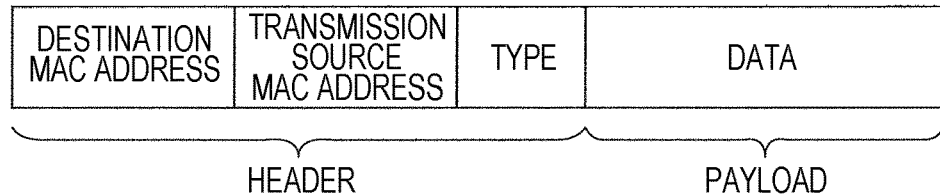
FIG. 5
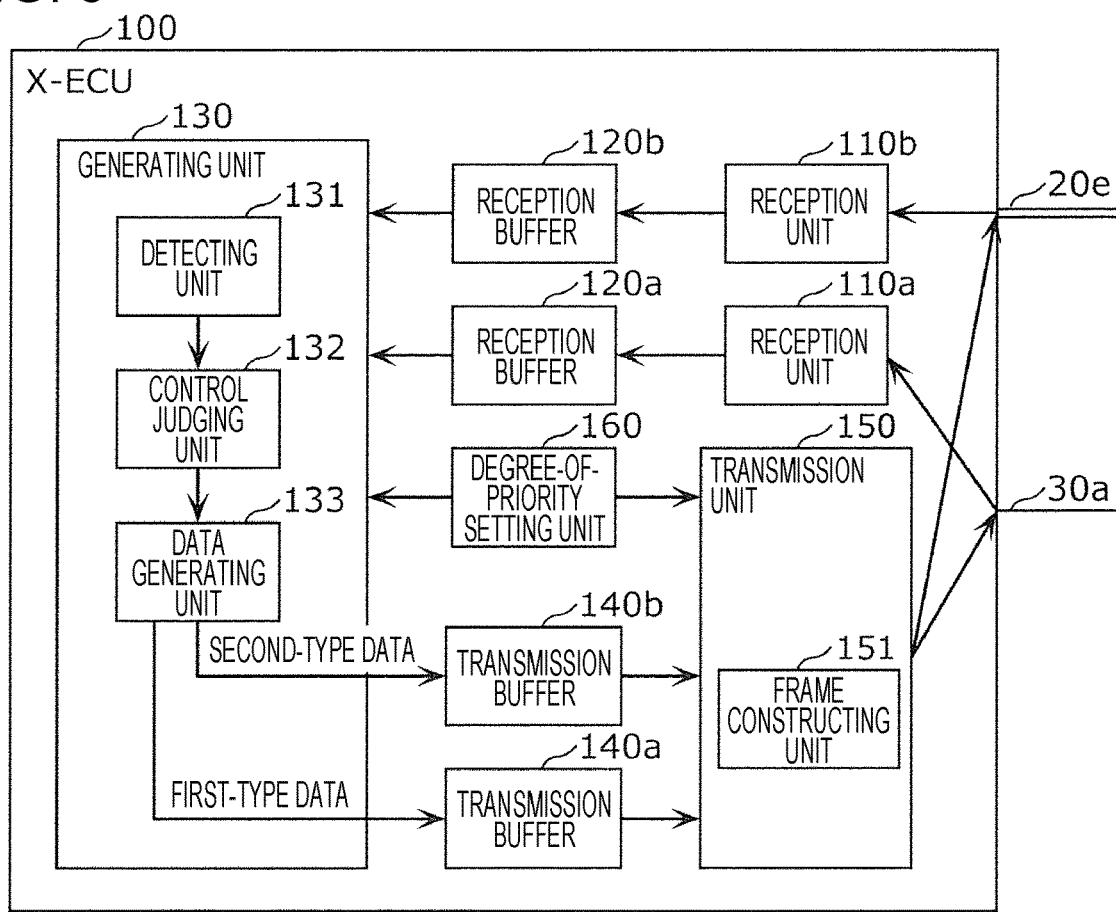
FIG. 6
| RECEPTION ID LIST |
|---|
| 0x100 |
| 0x101 |
| 0x102 |
| 0x200 |
| ⋮ |

| TRANSFER SOURCE | TRANSFER DESTINATION |
|---|---|
| CAN BUS 1 (CAN-ID: 0x100, 0x101) | MAC ADDRESS:00:11:22:33:44:55 |
| CAN BUS 1 (CAN-ID: 0x102) | MAC ADDRESS:00:12:23:34:45:56 |
| MAC ADDRESS:00:11:22:33:44:55 | CAN BUS 1 (CAN-ID: 0x300) |
| MAC ADDRESS:00:12:34:56:78:90 | CAN BUS 1 (CAN-ID: 0x400) |
| ⋮ | ⋮ |

DEGREE-OF-PRIORITY CONTROL INFORMATION

| TRAVELING STATE OF VEHICLE | OBJECT OF PRIORITY |
|---|---|
| TRAVELING | CONTROL SYSTEM DATA |
| STOPPED | INFORMATION SYSTEM DATA |

…

NETWORK HUB, TRANSFER METHOD, AND ONBOARD NETWORK SYSTEM

BACKGROUND

1. Technical Field

The present disclosure relates to message processing technology for relaying messages over an onboard network system including multiple network that have properties different from each other.

2. Description of the Related Art

Japanese Unexamined Patent Application Publication No. 2016-111477 describes a gateway that relays messages between devices conforming to the CAN protocol and devices conforming to the Ethernet (registered trademark) protocol and so forth.

SUMMARY

Further improvement has been needed with the above related art.

In one general aspect, the techniques disclosed here feature a network hub connected to a bus of a first network and connected to a second network in an onboard network system. The onboard network system includes the first network for transmission of first-type frames relating to traveling control of a vehicle over the bus following a first communication protocol, and the second network for transmission of second-type frames following a second communication protocol that is different from the first communication protocol. The network hub includes: a first reception buffer; a second reception buffer; a first transmission buffer; a second transmission buffer; a first receiver that sequentially receives the first-type frames from the bus and stores data within the first-type frames in the first reception buffer; a second receiver that sequentially receives the second-type frames from the second network and stores data within the second-type frames in the second reception buffer; a processor that selects which of the first network and the second network is a destination for data that is a content of one of the first reception buffer and the second reception buffer, stores the data in the first transmission buffer in a case of selecting the first network, and stores the data in the second transmission buffer in a case of selecting the second network; and a transmitter that transmits first yet-to-be-transmitted data in the first transmission buffer and second yet-to-be-transmitted data in the second transmission buffer. The transmitter performs priority transmission control, where priority yet-to-be-transmitted data in a priority transmission buffer that is one of the first transmission buffer and the second transmission buffer is transmitted with priority over non-priority yet-to-be-transmitted data in a non-priority transmission buffer that is another of the first transmission buffer and the second transmission buffer.

According to the present disclosure, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 3A and 3B are diagrams illustrating a format of a data frame stipulated in the CAN protocol (also referred to as "CAN frame");

FIG. 4 is a diagram illustrating the format of an Ethernet (registered trademark) frame (also referred to as "E-frame") exchanged over part of the onboard network;

FIG. 5 is a configuration diagram of an electronic control unit connected to two networks according to the first embodiment (also referred to as "X-ECU");

FIG. 6 is a diagram illustrating an example of a reception ID list used at the electronic control unit (X-ECU) network hub, and so forth, in the first embodiment;

DETAILED DESCRIPTION

Figure 1:
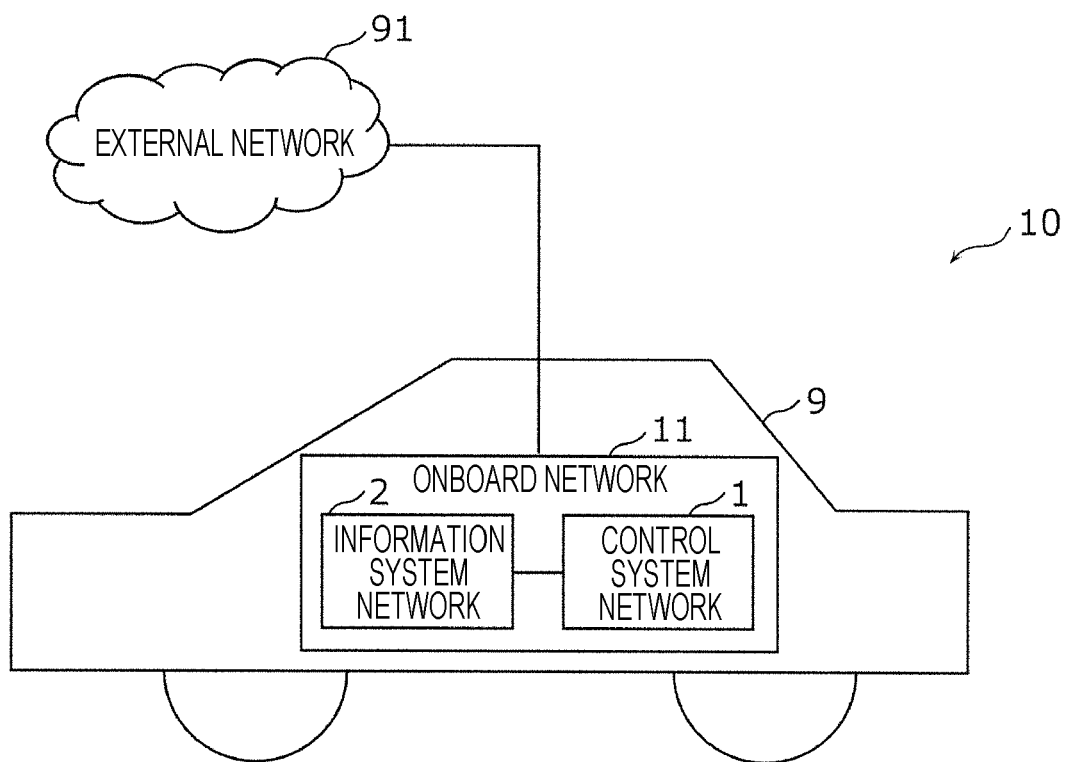
FIG. 1 is a diagram illustrating an onboard network including two networks in an onboard network system according to a first embodiment.

Underlying Knowledge Forming Basis of the Present Disclosure

In recent years, a great number of devices called electronic control units (ECU) have been placed in systems in automobiles. A network connecting these ECUs is referred to as an onboard network. Many standards exist for onboard networks. One of the most mainstream of these onboard networks is a standard called Controller Area Network (CAN), that is stipulated in ISO11898-1. In CAN, ECUs (nodes) connected to a bus that is a wired transmission path exchange frames (messages). There are no identifiers indicating transmission destinations or transmission sources in CAN. A transmitting node appends an ID (CAN-ID) to each frame and transmits (i.e., sends signals out onto the bus), and the receiving nodes receive (i.e., read signals from the bus) only of messages of CAN-IDs set beforehand. In CAN, a CAN-ID relates to the degree of priority of the message, and in a case where multiple nodes transmit messages at the same time, communication arbitration is performed in accordance with the values of the CAN-IDs. Communication arbitration and the like enables situations where messages collide and are lost on the bus to be avoided, so a CAN network is suitable for transmitting data regarding traveling control of vehicles and so forth, where loss of data could prevent safe traveling of the vehicle.

There also are known advanced driver-assistance systems (ADAS). Functions of ADAS (e.g., parking assistance, lane-keeping assistance, collision avoidance functions, and so forth) use information obtained by sensors connected to the onboard network system for example, which is to say that images taken by onboard cameras and information obtained by Light Detection and Ranging (LIDAR) is used, the surrounding environment of the vehicle is recognized by ECUs based on the information, and the vehicle is controlled in accordance with the results of recognition. Increasingly sophisticated ADASs can lead to increase in the amount of information communicated over the onboard network (data amount). The amount of data that can be transmitted by one frame (data frame in standard format) is eight bytes or less in CAN, which is not suitable for transmission of relatively large data amounts, such as images taken by onboard cameras, and so forth.

There is a standard called Ethernet (registered trademark) stipulated by IEEE 802.3, as a standard to transmit a greater amount of information. A frame in Ethernet (registered trademark) includes information indicating a transmission destination and a transmission source, in the header. The maximum amount of data that can be transmitted by one frame is greater in Ethernet (registered trademark) as compared to CAN, and the communication speed is faster. As described above, a CAN network that can avoid loss of messages is more suitable for data transmission for vehicle traveling control, but some loss of data such as images taken by onboard cameras or the like has little adverse effect. Accordingly, Ethernet (registered trademark) is more suitable for transmission of relatively large data such as images taken by onboard cameras or the like, as compared to a CAN network.

Japanese Unexamined Patent Application Publication No. 2016-111477 describes a gateway that relays messages between devices conforming to the CAN protocol and devices conforming to the Ethernet (registered trademark) protocol and so forth. However, Japanese Unexamined Patent Application Publication No. 2016-111477 does not indicate specific content of processing of the gateway relaying (transferring) messages between electronic control units connected to a CAN bus (hereinafter also referred to as "C-ECU") and electronic control units having an Ethernet (registered trademark) interface (hereafter referred to as "E-ECU").

The present Inventors have conceived the embodiments of the present disclosure based on the above-described consideration.

A network hub according to an aspect of the present disclosure is a network hub connected to a bus of a first network and connected to a second network in an onboard network system. The onboard network system includes the first network for transmission of first-type frames relating to traveling control of a vehicle over the bus following a first communication protocol, and the second network for transmission of second-type frames following a second communication protocol that is different from the first communication protocol. The network hub includes: a first reception buffer; a second reception buffer; a first transmission buffer; a second transmission buffer; a first receiver that sequentially receives the first-type frames from the bus and stores data within the first-type frames in the first reception buffer; a second receiver that sequentially receives the second-type frames from the second network and stores data within the second-type frames in the second reception buffer; a processor that selects which of the first network and the second network is a destination for data that is a content of one of the first reception buffer and the second reception buffer, stores the data in the first transmission buffer in a case of selecting the first network, and stores the data in the second transmission buffer in a case of selecting the second network; and a transmitter that transmits first yet-to-be-transmitted data in the first transmission buffer and second yet-to-be-transmitted data in the second transmission buffer. The transmitter performs priority transmission control, where priority yet-to-be-transmitted data in a priority transmission buffer that is one of the first transmission buffer and the second transmission buffer is transmitted with priority over non-priority yet-to-be-transmitted data in a non-priority transmission buffer that is another of the first transmission buffer and the second transmission buffer. Now, a network hub is a communication device (e.g., a relay device) connected to bus of a first network and to a second network, that includes data in a frame following a communication protocol used at a network that is the transmission destination of the data, and transmits the frame as signals corresponding the network that is the transmission destination. Such network hubs include gateways and so forth, for example. Using this network hub to relay (transfer) contents (data) of frames among networks enables one of a flow of data being received from a first network and transmitted to a second network, and a flow of data being received from the second network and transmitted to the first network, to be prioritized (i.e., transmission of data of that one can be performed first). Thus, according to this network hub, transmission of data can be appropriately performed by priority transmission control if a priority transmission buffer where data of which the destination is the one network is stored is decided appropriately, taking into consideration the properties of each of the first network and second network.

An arrangement may be made where the priority transmission buffer is the first transmission buffer, the transmitter performs transmission of the first yet-to-be-transmitted data in the first transmission buffer by sending a first-type frame including the first yet-to-be-transmitted data to the bus of the first network in a case where predetermined exception conditions are not satisfied, and by sending a second-type frame including the first yet-to-be-transmitted data to the second network in a case where the predetermined exception conditions are satisfied, and the transmitter performs transmission of the second yet-to-be-transmitted data in the second transmission buffer by sending a second-type frame including the second yet-to-be-transmitted data to the second network. The predetermined exception conditions may be satisfied when an abnormality is detected in a part of the first network. According to these, in a case where there is a possibility that appropriate transmission may not be performed if data is transmitted to the first network, data is transmitted using the second network as a as a diversion route. The data in the first transmission buffer of which the destination is the first network can be transmitted by this network hub over the second network that is a diversion route, and thereafter be transported again from the second network to the destination first network by another network hub or the like. Even in a case where the data in the first transmission buffer and the data in the second transmission buffer compete on the second network, each data is transmitted by an appropriate order, by priority transmission control where the first transmission buffer is given priority. That is to say, priority is given to the data relating to traveling control of the vehicle, thereby preventing transmission of other data (e.g., large-size data such as images or the like) from adversely affecting safe traveling of the vehicle and so forth. Even in a case where the configuration realizing transmission of the data in the first transmission buffer (e.g., communication circuit, processor, etc.) and the configuration realizing transmission of the second transmission buffer are partially used in common in the network hub, transmission of data relating to traveling control of the vehicle is given priority, thereby preventing transmission of other data from adversely affecting safe traveling of the vehicle and so forth.

An arrangement may be made where the transmitter performs the priority transmission control by repeatedly confirming the first transmission buffer and the second transmission buffer, transmitting the priority yet-to-be-transmitted data in the priority transmission buffer in a case where the first yet-to-be-transmitted data is in the first transmission buffer and the second yet-to-be-transmitted data is in the second transmission buffer during the confirming, transmitting the first yet-to-be-transmitted data in the first transmission buffer in a case where the first yet-to-be-transmitted data is in the first transmission buffer and the second yet-to-be-transmitted data is not in the second transmission buffer during the confirming, and transmitting the second yet-to-be-transmitted data in the second transmission buffer in a case where the first yet-to-be-transmitted data is not in the first transmission buffer and the second yet-to-be-transmitted data is in the second transmission buffer during the confirming. Accordingly, in a case where there is data to be transmitted of which the first network is the destination, and data to be transmitted of which the second network is the destination, the one data corresponding to the priority transmission buffer that has been decided beforehand is transmitted first, so the one data can be speedily transmitted.

An arrangement may be made where the transmitter performs the priority transmission control by repeatedly confirming the first transmission buffer and the second transmission buffer, transmitting a predetermined quantity of the priority yet-to-be-transmitted data in the priority transmission buffer, and thereafter transmitting one of the non-priority yet-to-be-transmitted data in the non-priority transmission buffer, in a case where the first yet-to-be-transmitted data is in the first transmission buffer and the second yet-to-be-transmitted data is in the second transmission buffer during the confirming, transmitting the first yet-to-be-transmitted data in the first transmission buffer in a case where the first yet-to-be-transmitted data is in the first transmission buffer and the second yet-to-be-transmitted data is not in the second transmission buffer during the confirming, and transmitting the second yet-to-be-transmitted data in the second transmission buffer in a case where the first yet-to-be-transmitted data is not in the first transmission buffer and the second yet-to-be-transmitted data is in the second transmission buffer during the confirming. The predetermined quantity may be decided to be, for example, a quantity greater than one worth of the data in the priority transmission buffer (e.g., a count of two or more data, a data amount that is twice or more that of one data worth, or the like), so that the data within the priority transmission buffer is transmitted with priority. Accordingly, a situation where no data in the non-priority transmission buffer is transmitted at all due to consecutive transmission of data in the priority transmission buffer can be prevented, for example.

An arrangement may be made where the transmitter performs the priority transmission control by repeatedly confirming the first transmission buffer and the second transmission buffer, transmitting the priority yet-to-be-transmitted data in the priority transmission buffer when a non-transmission time of the non-priority yet-to-be-transmitted data in the non-priority transmission buffer does not exceed a predetermined threshold value, and transmitting the non-priority yet-to-be-transmitted data in the non-priority transmission buffer when the non-transmission time exceeds the predetermined threshold value, transmitting the first yet-to-be-transmitted data in the first transmission buffer in a case where the first yet-to-be-transmitted data is in the first transmission buffer and the second yet-to-be-transmitted data is not in the second transmission buffer during the confirming, and transmitting the second yet-to-be-transmitted data in the second transmission buffer in a case where the first yet-to-be-transmitted data is not in the first transmission buffer and the second yet-to-be-transmitted data is in the second transmission buffer during the confirming. The predetermined threshold value relating to non-transmission time may be decided to be, for example, a time longer than the time required for transmission of one worth of data in the priority transmission buffer, so that the data within the priority transmission buffer is transmitted with priority. Accordingly, a situation where no data in the non-priority transmission buffer is transmitted at all due to consecutive transmission of data in the priority transmission buffer can be prevented, for example.

An arrangement may be made where the processor performs priority readout control for selecting which of the first network and the second network is the destination, where content of a priority reception buffer that is one of the first reception buffer and the second reception buffer is read with priority over content of a non-priority reception buffer that is another of the first transmission buffer and the second transmission buffer, and in a case where the priority transmission buffer is the first transmission buffer, the priority reception buffer is the first reception buffer, and in a case where the priority transmission buffer is the second transmission buffer, the priority reception buffer is the second reception buffer. Accordingly, in a case where the configuration realizing readout of the data in the first reception buffer and selecting a destination of the data (e.g., processor, etc.) and the configuration realizing readout of the data in the second reception buffer and selecting a destination of the data are partially used in common in the network hub, data in one reception buffer can be given propriety in accordance with the network that will realize speedy transmission.

An arrangement may be made where the processor performs the priority readout control by repeatedly confirming the first reception buffer and the second reception buffer, reading priority unread data in the priority reception buffer out of the first reception buffer and the second reception buffer in a case where first unread data is in the first reception buffer and second unread data is in the second reception buffer during the confirming, reading the first unread data in the first reception buffer in a case where the first unread data is in the first reception buffer and the second unread data is not in the second reception buffer during the confirming, and reading the second unread data in the second reception buffer in a case where the first unread data is not in the first reception buffer and the second unread data is in the second reception buffer during the confirming. Accordingly, in a case where there is unread data received from the first network (i.e., data that has not been read out) and unread data received from the second network the one data corresponding to the priority reception buffer decided beforehand is read out first, so that one data can be speedily transmitted.

An arrangement may be made where the processor performs the priority readout control by repeatedly confirming the first reception buffer and the second reception buffer, reading a predetermined quantity of priority unread data in the priority reception buffer out of the first reception buffer and the second reception buffer, and thereafter reading one non-priority unread data in the non-priority reception buffer, in a case where first unread data is in the first reception buffer and second unread data is in the second reception buffer during the confirming, reading the first unread data in the first reception buffer in a case where the first unread data is in the first reception buffer and the second unread data is not in the second reception buffer during the confirming, and reading the second unread data in the second reception buffer in a case where the first unread data is not in the first reception buffer and the second unread data is in the second reception buffer during the confirming. The predetermined quantity may be decided to be, for example, a quantity greater than one worth of the data in the priority reception buffer (e.g., a count of two or more data, a data amount that is twice or more that of one data worth, or the like), so that the data within the priority reception buffer is read out with priority. Accordingly, a situation where no data in the non-priority reception buffer is read out at all and not transmitted due to consecutive readout of data in the priority reception buffer can be prevented, for example.

An arrangement may be made where the processor performs the priority readout control by repeatedly confirming the first reception buffer and the second reception buffer, reading priority unread data in the priority reception buffer when a non-readout time of non-priority unread data in the non-priority reception buffer does not exceed a predetermined threshold value, and reading the non-priority unread data in the non-priority reception buffer when the non-readout time exceeds the predetermined threshold value, in a case where first unread data is in the first reception buffer and second unread data is in the second reception buffer during the confirming, reading the first unread data in the first reception buffer in a case where the first unread data is in the first reception buffer and the second unread data is not in the second reception buffer during the confirming, and reading the second unread data in the second reception buffer in a case where the first unread data is not in the first reception buffer and the second unread data is in the second reception buffer during the confirming. The predetermined threshold value relating to non-readout time (i.e., time not read out yet) may be decided to be, for example, a time longer than the time required for readout of one worth of data in the priority reception buffer, so that the data within the priority reception buffer is read out with priority. Accordingly, a situation where no data in the non-priority reception buffer is read out at all and not transmitted due to consecutive readout of data in the priority reception buffer can be prevented, for example.

In a case where the processor selects the first network as the destination for the data that is the content of the second reception buffer, the data may be split into a plurality of data, and the plurality of data may be stored in the first transmission buffer. Accordingly, even in a case where data exceeding the maximum data amount (maximum data length) of a first-type frame transmitted over the first network is received from the second network, transfer can be appropriately performed by splitting.

An arrangement may be made where the first communication protocol is the CAN (Controller Area Network) protocol, the second communication protocol is the Ethernet (registered trademark) protocol, the first-type frames are data frames, and the second-type frames are Ethernet (registered trademark) frames. Accordingly, appropriate data transfer can be performed between a CAN network suitable for transmission of data relating to traveling control of the vehicle, and an Ethernet (registered trademark) network suitable for transmission of large-size data such as images and so forth.

A maximum data amount of the second-type frames following the second communication protocol may be greater than a maximum data amount of the first-type frames following the first communication protocol. Accordingly, appropriate data transfer can be performed between the first network serving as a control system network suitable for transmission of data relating to traveling control of the vehicle, and the second network serving as an information system network suitable for transmission of large-size data such as images and so forth.

The priority transmission buffer may be the first transmission buffer while the vehicle is traveling, and may be the second transmission buffer while the vehicle is stopped.

Accordingly, when the vehicle is traveling, transmission of data relating to traveling control of the vehicle can be speedily performed, and when the vehicle is stopped, transmission of data other than data relating to traveling control of the vehicle (e.g., multimedia data such as images, audio, etc., and so forth) can be speedily performed, for example.

A transfer method according to an aspect of the present disclosure is a transfer method for a network hub connected to a bus of a first network and connected to a second network in an onboard network system. The onboard network system includes the first network for transmission of first-type frames relating to traveling control of a vehicle over the bus following a first communication protocol, and the second network for transmission of second-type frames following a second communication protocol that is different from the first communication protocol. The network hub includes a first reception buffer, a second reception buffer, a first transmission buffer, and a second transmission buffer. The transfer method includes: sequentially receiving the first-type frames from the bus and storing data within the first-type frames in the first reception buffer; sequentially receiving the second-type frames from the second network and storing data within the second-type frames in the second reception buffer; selecting which of the first network and the second network is a destination for data that is a content of one of the first reception buffer and the second reception buffer, storing the data in the first transmission buffer in a case of selecting the first network, and storing the data in the second transmission buffer in a case of selecting the second network; and transmitting first yet-to-be-transmitted data in the first transmission buffer and second yet-to-be-transmitted data in the second transmission buffer. In the transmitting, priority transmission control is performed, where priority yet-to-be-transmitted data in a priority transmission buffer that is one of the first transmission buffer and the second transmission buffer is transmitted with priority over non-priority yet-to-be-transmitted data in a non-priority transmission buffer that is another of the first transmission buffer and the second transmission buffer. Accordingly, transmission of data can be appropriately performed by priority transmission control if a priority transmission buffer where data of which the destination is the one network is stored is decided appropriately, taking into consideration the properties of each of the first network and second network.

An onboard network system according to an aspect of the present disclosure is an onboard network system including: a first network for transmission of first-type frames relating to traveling control of a vehicle over a bus following a first communication protocol; a second network for transmission of second-type frames following a second communication protocol that is different from the first communication protocol; an electronic control unit connected to the bus; an electronic control unit connected to the second network; and a network hub connected to the bus and the second network. The network hub includes a first reception buffer, a second reception buffer, a first transmission buffer, a second transmission buffer, a first receiver that sequentially receives the first-type frames from the bus and stores data within the first-type frames in the first reception buffer, a second receiver that sequentially receives the second-type frames from the second network and stores data within the second-type frames in the second reception buffer, a processor that selects which of the first network and the second network is a destination for data that is a content of one of the first reception buffer and the second reception buffer, stores the data in the first transmission buffer in a case of selecting the first network, and stores the data in the second transmission buffer in a case of selecting the second network, and a transmitter that transmits first yet-to-be-transmitted data in the first transmission buffer and second yet-to-be-transmitted data in the second transmission buffer. The transmitter performs priority transmission control, where priority yet-to-be-transmitted data in a priority transmission buffer that is one of the first transmission buffer and the second transmission buffer is transmitted with priority over non-priority yet-to-be-transmitted data in a non-priority transmission buffer that is another of the first transmission buffer and the second transmission buffer. Accordingly, transmission of data can be appropriately performed between electronic control units connected to networks that are different from each other.

It should be noted that these general or specific embodiments may be implemented as a system, a method, an integrated circuit, a computer program, or a computer-readable recording medium such as a CD-ROM, and may be realized by any combination of a system, method, integrated circuit, computer program, and recording medium.

The following is a description of an onboard network system including an electronic control unit (ECU) and a network hub according to embodiments with reference to the drawings. Note that the embodiments described below are all specific examples of the present disclosure. Accordingly, values, components, placements and connected states of components, steps (processes) and the order of steps, and so forth illustrated in the following embodiments, are only exemplary, and do not restrict the present disclosure. Components in the following embodiments which are not included in an independent Claim are optionally addable components. The drawings are schematic diagrams, and are not necessarily created in an exact manner.

First Embodiment

An onboard network system 10 including multiple ECUs and a network hub that exchange data over an onboard network will be described as an embodiment of the present disclosure with reference to the drawings.

1.1 Overall Configuration of Onboard Network System 10

FIG. 1 is a diagram illustrating an onboard network 11 including two networks in the onboard network system 10. Installed in a vehicle 9 are various types of devices, such as control devices, sensors, actuators, user interface devices, ECUs, and so forth. The onboard network system 10 is a network communication system that has the onboard network 11 for the various devices such as the sensors, ECUs, and so forth, installed in the vehicle 9, to exchange information in cooperation. The onboard network 11 is configured including a control system network 1 (first network) where various types of frames such as data frames relating to traveling control of the vehicle 9 are transmitted over a bus (CAN bus) following the CAN protocol, and an information system network 2 (second network) where Ethernet (registered trademark) frames (E-frames) are transmitted following the Ethernet (registered trademark) protocol. The onboard network 11 can be wirelessly connected to an external network 91 outside of the vehicle 9, such as the Internet or the like.

The maximum data amount of an E-frame (1500 bytes or more) stipulated by the Ethernet (registered trademark) protocol is considerably greater than the maximum data amount of CAN frame (eight byes for standard format) stipulated by the CAN protocol. electronic control units relating to traveling control of the vehicle 9 (C-ECUs) and so forth are connected to the bus of the control system network 1. Relatively small data, such as vehicle state data indicating the state of the vehicle 9 that is the base for traveling control of the vehicle 9, vehicle control data for traveling control that indicates operation instructions of actuators installed in the vehicle 9, and so forth, are primarily transmitted over the control system network 1. Various types of sensors that observe the situation around the vehicle 9, such as onboard cameras (i.e., image sensors), LIDAR, and so forth, are connected to the information system network 2. Electronic control units for processing information from the sensors and providing information to the passenger (user) of the vehicle 9 (E-ECUs) may also be connected to the information system network 2. Sensor information such as images taken by onboard cameras, three-dimensional data generated by LIDAR, and so forth (e.g., relatively large data generated by sensors) is primarily transmitted over the information system network 2.

Figure 2:
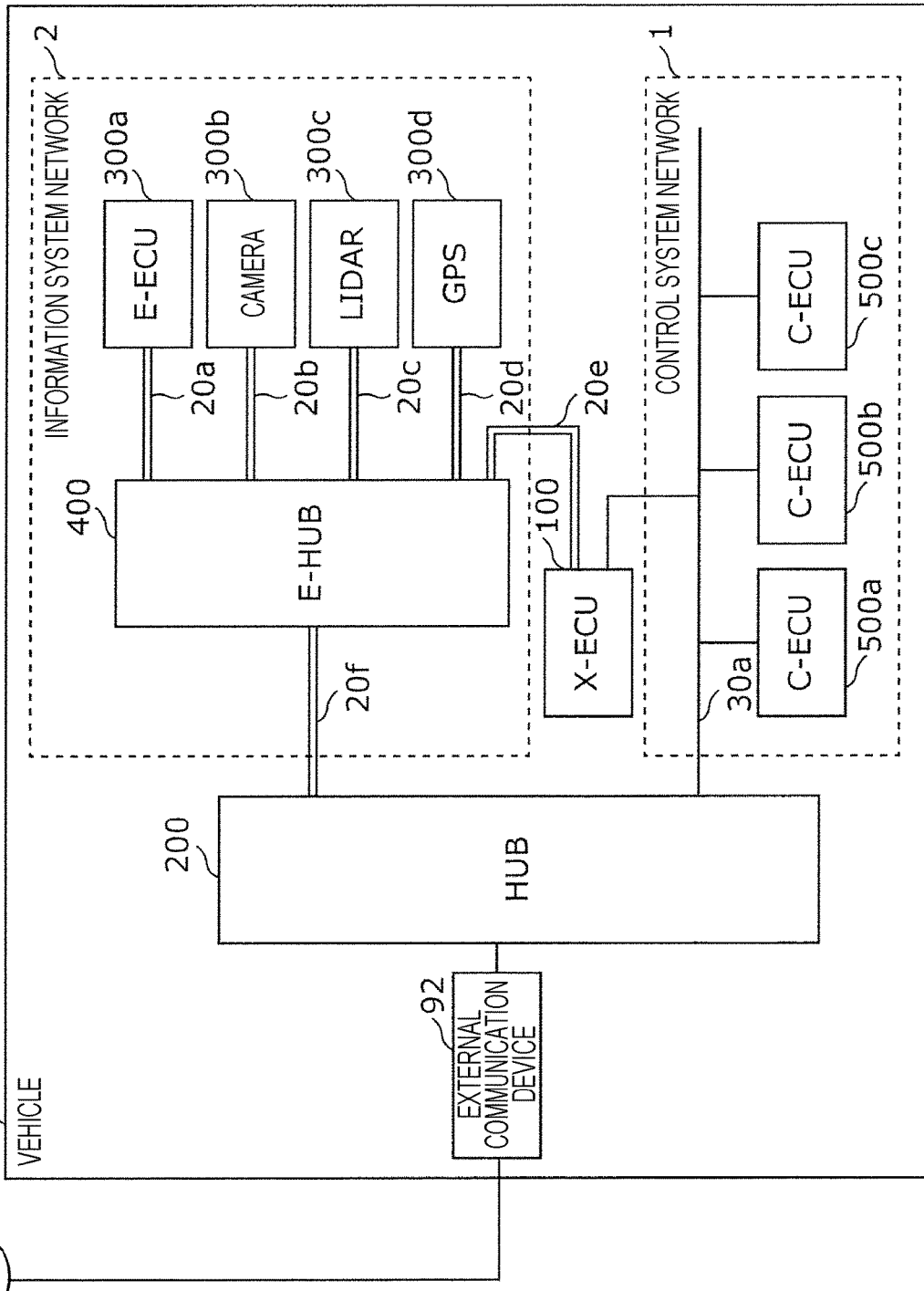
FIG. 2 is a diagram illustrating a schematic configuration of the onboard network system according to the first embodiment.

FIG. 2 illustrates the overall configuration of the onboard network system 10. The onboard network system 10 includes the control system network 1, the information system network 2, a network hub 200 connected to both networks, and an electronic control unit 100 connected to both networks (referred to as "X-ECU").

C-ECUs 500a through 500c, which are ECUs having communication interfaces conforming to the CAN protocol, are connected to a bus 30a that is a transmission path in the control system network 1. The C-ECUs 500a through 500c respectively are an engine control ECU that handles control of the engine, a steering control ECU that handles control of steering, and a brake control ECU that handles control of braking, and so forth. The C-ECUs 500a through 500c communicate with each other via the bus 30a, and exchange frames following the CAN protocol. The C-ECUs 500a through 500c respectively obtain the state of the engine, steering, brakes, and so forth, and transmit data frames (CAN frames) indicating state to the bus 30a making up the control system network 1, periodically for example. The C-ECUs 500a through 500c can also receive CAN frames from the bus 30a making up the control system network 1, interpret the CAN frames, distinguish whether or not the CAN frames are CAN frames having CAN-IDs that should be received, and effect control relating to the engine, steering, brakes, and so forth, connected to the C-ECUs, in accordance with data within the CAN frames (contents of data fields) as necessary, and also generate and transmit CAN frames as necessary.

In the information system network 2, an E-ECU 300a that is an ECU having a communication interface conforming to the Ethernet (registered trademark) protocol, a camera 300b, a LIDAR 300c, and a Global Positioning System (GPS) receiver (referred to as "GPS") 300d, are connected by an E-hub 400 that is a network hub conforming to Ethernet (registered trademark), and each of Ethernet (registered trademark) cables 20a through 20d that are transmission paths. The E-ECU 300a performs transmission and receptions of E-frames following the Ethernet (registered trademark) protocol. The E-ECU 300a may have a display, for example, and be an ECU having functions of providing information to the user. The E-ECU 300a, camera 300b, LIDAR 300c, and GPS 300d, each have unique Media Access Control (MAC) addresses. The E-hub 400 is, for example, an Ethernet (registered trademark) switch (switching hub). The E-hub 400 stores a MAC address table for example, and learns corresponding MAC addresses for each cable connecting terminal (port) upon receiving E-frames. The E-hub 400 also selects a port to serve as a transfer destination based on a destination MAC address in the header of a received E-frame in accordance with the MAC address table, and sends the E-frame out to the cable connected to that port, thereby transferring the E-frame.

The X-ECU 100 is an ECU that has a communication interface conforming to the CAN protocol and a communication interface conforming to the Ethernet (registered trademark) protocol, and handles some types of ADAS functions (e.g., parking assistance, lane-keeping assistance, collision avoidance functions, and so forth). The X-ECU 100 is connected to the bus 30a, and is connected to the E-hub 400 by an Ethernet (registered trademark) cable 20e. The X-ECU 100 has a unique MAC address.

The hub 200 is a communication device that has a communication protocol conversion function, and has a communication data relay function. The hub 200 is connected to the bus 30a, and is connected to the E-hub 400 by an Ethernet (registered trademark) cable 20f. The hub 200 has a unique MAC address, for example. The hub 200 is also connected to an external communication device 92. The external communication device 92 is a device having communication functions of communicating with a server device outside of the vehicle 9 (e.g., a computer having functions of providing information to the vehicle or the like) via the external network 91 and so forth, for example.

Note that many more ECUs may be included in the onboard network system 10 bedsides the X-ECU 100, E-ECU 300a, and C-ECUs 500a through 500c. For example, C-ECUs that are omitted from illustration may be connected to the bus 30a besides the C-ECUs 500a through 500c. Also, E-ECUs omitted from illustration may be connected to the E-hub 400, either directly or via another E-hub, for example.

The ECUs (E-ECUs, C-ECUs, and X-ECU) are devices that include, for example, processors (microprocessors), digital circuits such as memory and so forth, analog circuits, communication circuits, and so forth. The memory is ROM, RAM, and so forth, and can store programs (computer programs serving as software) that are executed by processors. The memory may include non-volatile memory. An ECU realized various types of functions by a processor operating in accordance with programs (computer programs), for example. Note that a computer program is configured by combining multiple sets of command codes instructing commands with respect to the processor, to achieve predetermined functions.

1.2 Configuration of Frames Exchanged Over Onboard Network 11

The C-ECUs 500a through 500c and so forth exchange frames following the CAN protocol on the control system network 1. Frames in the CAN protocol include data frames, remote frames, overload frames, and error frames. Data frames will be described with primary focus here.

FIGS. 3A and 3B illustrate the format of a data frame (CAN frame) exchange exchanged over the control system network 1. FIG. 3A illustrates a standard format. A data frame includes a start of frame (SOF), ID (CAN-ID), remote transmission request (RTR), identifier extension (IDE), reserved bit "r", size data, cyclic redundancy check (CRC) sequence, CRC delimiter "DEL", acknowledgement (ACK) slot, ACK delimiter "DEL", and end of frame (EOF), in the standard format. The ID (CAN-ID) serving as the content of the ID field is an identifier indicating the type of data, and also is referred to as a message ID. Note that in CAN, in a case where multiple nodes start transmission at the same time, communication arbitration is performed, where a frame having the smallest CAN-ID value is given priority. Size is a data length code (DLC) indicating the length of the following data field (data). The specification of the data (content of the data) is not stipulated in the CAN protocol, and is set in the onboard network system 10. Accordingly, the specification can be dependent on the model of the vehicle, the manufacturer (automaker), or the like. FIG. 3B illustrates an extended format. Although the standard format will be described as being used on the control system network 1 in the present embodiment, in a case of using the extended format on the control system network 1, the 29 bits of the 11-bit base ID in the ID field (part of the CAN-ID), and the 18-bit extended ID (remainder of CAN-ID), having been combined, can be used as the CAN-ID.

FIG. 4 illustrates the format of frames exchanged on the information system network 2 (E-frames). An E-frame is confirmed by adding a header (Ethernet (registered trademark) header) in front of the payload that stores data, which is the primary content being transmitted, as illustrated in FIG. 4. The header includes destination MAC address, transmission source MAC address, and type.

1.3 Configuration of X-ECU 100

FIG. 5 is a configuration diagram of the X-ECU 100. The X-ECU 100 is configured including a reception unit 110a (first reception unit), a reception unit 110b (second reception unit), a reception buffer 120a (first reception buffer), a reception buffer 120b (second reception buffer), a generating unit 130, a transmission buffer 140a (first transmission buffer), a transmission buffer 140b (second transmission buffer), a transmission unit 150, and a degree-of-priority setting unit 160. These components are realized by communication circuits in the X-ECU 100, a processor or digital circuits executing programs stored in the memory, and so forth.

The reception buffer 120a, reception buffer 120b, transmission buffer 140a, and transmission buffer 140b are each configured of storage media such as memory or the like, and are first-in first-out (FIFO) buffers, for example. The reception buffer 120a (first reception buffer) is also referred to as a control system data reception buffer, and the transmission buffer 140a (first transmission buffer) is also referred to as a control system data transmission buffer. The reception buffer 120b (second reception buffer) is also referred to as an information system data reception buffer, and the transmission buffer 140b (second transmission buffer) is also referred to as an information system data transmission buffer.

The reception unit 110a sequentially receives CAN frames from the bus 30a of the control system network 1. Each time a CAN frame is received, the reception unit 110a confirms whether the CAN-ID of the received CAN frame is an ID that should be received, based on a reception ID list, and if an ID that should be received, stores the contents of the CAN frame in the reception buffer 120a. The contents of a CAN frame that the reception unit 110a stores in the reception buffer 120a is information where the CAN-ID and size (DLC) and so forth have been added to data (the contents of the data field). FIG. 6 illustrates an example of a reception ID list that the X-ECU 100 uses. The reception ID list of the X-ECU 100 lists CAN-IDs of CAN frames including vehicle state data and so forth, for example. If the CAN-ID of a received CAN frame is an ID not shown in the reception ID list, the reception unit 110a cancels reception of that CAN frame, and does not store the contents of that CAN frame in the reception buffer 120a.

The reception unit 110b sequentially receives E-frames including the MAC address of the X-ECU 100 or the like as the destination MAC address for example, from the cable 20e of the information system network 2. Each time an E-frame is received, the reception unit 110b stores the contents of that E-frame in the reception buffer 120b. The contents of an E-frame that the reception unit 110a stores in the reception buffer 120b is data (contents of the payload), for example. For example, E-frames that have images and other data from various types of sensors such as the camera 300b, LIDAR 300c, GPS 300d, and so forth, in the payloads thereof, are transmitted with the X-ECU 100 as the destination, and the reception unit 110b receives these E-frames.

The generating unit 130 sequentially generates control system data (first-type data) that is data for traveling control of the vehicle 9 and information system data(second-type data) that is data used for other than traveling control of the vehicle 9 from the contents of the reception buffer 120a and reception buffer 120b, stores the generated control system data in the transmission buffer 140a (control system data transmission buffer) and stores the generated information system data in the transmission buffer 140b (information system data transmission buffer). The generating unit 130 is configured including a detecting unit 131, a control judging unit 132, and a data generating unit 133.

The detecting unit 131 detects the situation in the environment around the vehicle 9 and various types of items set beforehand regarding the state of the vehicle 9 (e.g., distance to an obstruction in the path of travel of the vehicle 9, relative speed as to the obstruction, angle between white, yellow, and other color lines displayed on the pavement and the direction of travel of the vehicle 9, and so forth), based on the data read out from the control system data reception buffer or information system data reception buffer. In a case of reading out data from each of the control system data reception buffer and information system data reception buffer, the detecting unit 131 performs priority readout control, where the contents of a priority reception buffer that is one of the control system data reception buffer and information system data reception buffer are read out with higher propriety than the contents of a non-priority buffer that is the other buffer, based on priority information set in the degree-of-priority setting unit 160 (e.g., information for identifying the priority reception buffer from which readout should be performed with priority, or the like). The degree-of-priority setting unit 160 stores priority information in a region of a storage medium such as memory. Note that in one example of the present embodiment, priority information is set at the degree-of-priority setting unit 160 indicating that data of the control system data reception buffer should be read out with priority over the information system data reception buffer. In a case where data has been read out from the reception buffers 120a and 120b, that data is deleted from the reception buffer, for example.

The control judging unit 132 judges whether or not traveling control of the vehicle 9 is necessary, or whether or not control of the various types of sensors installed in the vehicle 9 is necessary, based on the results of detection by the detecting unit 131, and in a case where control is necessary, sets the content of control based on a predetermined algorithm set beforehand, and notifies the data generating unit 133. For example, in a case where distance to an obstruction in the path of the vehicle 9, vehicle speed, and so forth satisfy certain conditions, control content to bring the vehicle 9 to an emergency stop may be obtained. Also, for example, in a case where sensor information obtained from a sensor satisfies certain conditions, control content for adjusting the sensor may be obtained.

The data generating unit 133 generates control system data such as vehicle control data or the like in accordance with the control content notified thereto in a case where the control judging unit 132 has judged that traveling control of the vehicle 9 is necessary, and stores that control system data in the control system data transmission buffer. Note that the data generating unit 133 sets a CAN-ID in accordance with the control content notified thereto, attaches the CAN-ID to that vehicle control data or the like, and stores in the control system data transmission buffer. The data generating unit 133 generates information system data such as sensor control data or the like in accordance with the contents of control notified thereto in a case where the control judging unit 132 has judged that sensor control is necessary, and stores that information system data in the information system data transmission buffer.

Also, the data generating unit 133 sets a MAC address serving as a destination of sensor control data or the like in accordance with the control content notified thereto, attaches the MAC address to that sensor control data or the like, and stores in the information system data transmission buffer. The data generating unit 133 generates control system data by processing based on data relating to a CAN frame read out from the control system data reception buffer at the least (e.g., vehicle state data or the like), and generates information system data by processing based on data relating to an E-frame read out from the information system data reception buffer at the least (e.g., sensor information such as images or the like). Note that the data generating unit 133 may generate control system data or information system data by processing based on both vehicle state data and sensor information, for example.

The transmission unit 150 is configured including a frame constructing unit 151 that constructs frames in accordance with the communication protocols corresponding to each of the control system network 1 and information system network 2. The transmission unit 150 transmits the control system data in the transmission buffer 140a (control system data transmission buffer) that has not been transmitted yet, and the information data in the transmission buffer 140b (information system data transmission buffer) that has not been transmitted yet. The transmission unit 150 uses the frame constructing unit 151 to transmit the data to the network to which it should be transmitted, included in a frame corresponding to the network to which it should be transmitted. The network to which the information system data should be transmitted is the information system network 2, and the network to which the control system data should be transmitted is the control system network 1, but in a case where predetermined exception conditions are satisfied such that transmission cannot be performed to the control system network 1 (e.g., a case where an abnormality has been detected in at least part of the control system network 1 or the like), this is the information system network 2.

That is to say, the transmission unit 150 performs transmission of information system data by sending out E-frames including that information system data to the information system network 2. In a case where predetermined exception conditions are not satisfied, the transmission unit 150 performs transmission of CAN frames including that control system data by sending out onto the bus 30a of the control system network 1, and in a case where the predetermined exception conditions are satisfied, performs transmission of E-frames including that control system data by sending out onto the information system network 2. CAN frames including control system data sent out onto the bus 30a by the transmission unit 150 have been generated by, for example, including control system data in the data field of a CAN frame, and including the CAN-ID that had been attached to the control system data in the transmission buffer in the ID field of the CAN frame. An E-frame including information system data, that is sent out to the cable 20e by the transmission unit 150, is an E-frame where the payload includes, for example, identification flag information representing whether or not control system data to be transmitted to the control system network 1 is included, the identification flag information indicating that control system data is not included, and information system data, with the MAC address that had been attached to the information system data in the transmission buffer set as the destination MAC address. An E-frame including control system data, that is sent out to the cable 20e by the transmission unit 150, is an E-frame where the payload includes, for example, identification flag information representing whether or not control system data to be transmitted to the control system network 1 is included, the identification flag information indicating that control system data is included, and control system data, with a particular MAC address set beforehand (e.g., a broadcast address, etc.) set as the destination MAC address. Note that in E-frames transmitted by the transmission unit 150, the identification flag information may be provided in the type in the header or the like, instead of the payload, and for example, a bit for identifying whether or not a global MAC address in the destination MAC address in the header may be used as identification flag information, and set to a value not that of a global MAC address, thereby indicating that control system data to be transmitted to the control system network 1 is included.

In a case of transmitting data of each of the control system data transmission buffer and information system data transmission buffer, the transmission unit 150 performs priority transmission control, where the priority type data that is one of the control system data (first-type data) and information system data (second-type data) is transmitted with higher propriety than non-priority type data that is the other data, based on priority information set in the degree-of-priority setting unit 160 (e.g., information for identifying the priority type data regarding which of control system data and information system data should be transmitted with priority, or the like). Note that in one example of the present embodiment, priority information is set at the degree-of-priority setting unit 160 indicating that control system data should be transmitted with priority over the information system data. In a case where data has been transmitted from the transmission buffers 140a and 140b by the transmission unit 150, that data is deleted from the transmission buffer, for example.

The degree-of-priority setting unit 160 sets and stores priority information indicating which of control system data and information system data to give priority to (which has higher priority). Note that the priority information may be set such that the control system data and information system data have the same degree of priority. The degree-of-priority setting unit 160 may set the priority information to be that set beforehand, or may set the priority information so as to be that based on the state of the vehicle 9 in the past, processing results of onboard devices, and so forth.

1.4 Configuration of Hub 200

The hub 200 is configured including, for example, digital circuits such as a processor, memory, and so forth, analog circuits, communication circuits, and so forth, and has a function of transferring (relaying) frames received from one transmission path (bus or cable) to another transmission path.

Figures 7, 8:
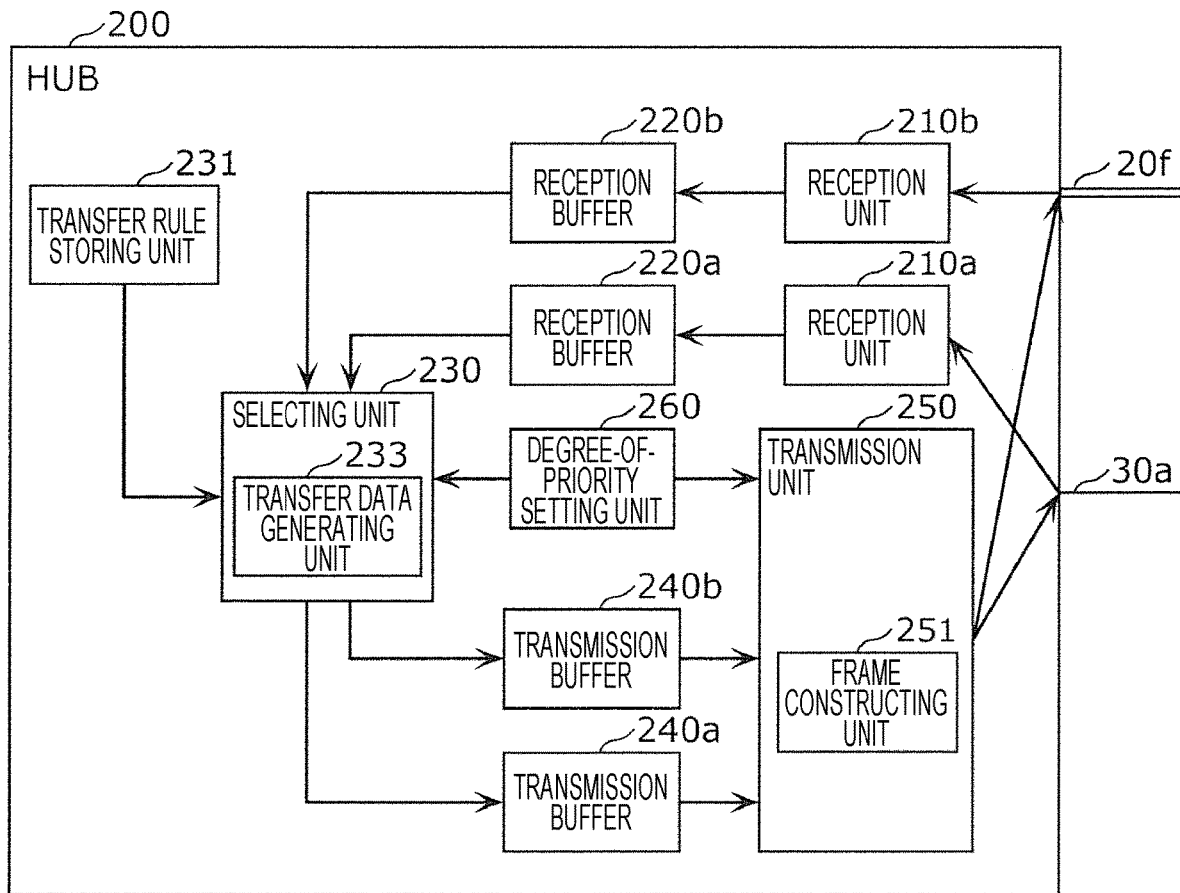
FIG. 7 is a configuration diagram of the hub according to the first embodiment.
FIG. 8 is a diagram illustrating an example of transfer rule information used at the hub according to the first embodiment.

FIG. 7 is a configuration diagram of the hub 200. The hub 200 is configured including a reception unit 210a (first reception unit), a reception unit 210b (second reception unit), a reception buffer 220a (first reception buffer), a reception buffer 220b (second reception buffer), a selecting unit 230, a transfer rule storing unit 231, a transmission buffer 240a (first transmission buffer), a transmission buffer 240b (second transmission buffer), a transmission unit 250, and a degree-of-priority setting unit 260. These components are realized by communication circuits in the hub 200, a processor or digital circuits executing programs stored in the memory, and so forth.

The reception buffer 220a, reception buffer 220b, transmission buffer 240a, and transmission buffer 240b are each configured of storage media such as memory or the like, and are FIFO buffers, for example. The reception buffer 220a (first reception buffer) is also referred to as a control system data reception buffer, and the transmission buffer 240a (first transmission buffer) is also referred to as a control system data transmission buffer. The reception buffer 220b (second reception buffer) is also referred to as an information system data reception buffer, and the transmission buffer 240b (second transmission buffer) is also referred to as an information system data transmission buffer.

The reception unit 210a sequentially receives CAN frames from the bus 30a of the control system network 1. Each time a CAN frame is received, the reception unit 210a confirms whether the CAN-ID of the received CAN frame is an ID that should be received, based on a reception ID list (see FIG. 6), and if an ID that should be received, stores the contents of the CAN frame in the reception buffer 220a. The contents of a CAN frame that the reception unit 210a stores in the reception buffer 220a is the CAN-ID and size (DLC) and so forth added to data (the contents of the data field). A reception ID list used by the hub 200 lists CAN-IDs of CAN frames including data that can be the object of transfer to the information system network 2 (e.g., vehicle state data and so forth), for example, and may have different content from the reception ID list used by the X-ECU 100. If the CAN-ID of a received CAN frame is an ID not shown in the reception ID list, the reception unit 210a cancels reception of that CAN frame, and does not store the contents of that CAN frame in the reception buffer 220a.

The reception unit 210b sequentially receives E-frames from the cable 20f of the information system network 2, and each time an E-frame is received, the reception unit 210b stores the contents of that E-frame in the reception buffer 220b. The contents of an E-frame that the reception unit 210b stores in the reception buffer 220b is data (contents of the payload) to which a transmission source MAC address has been added, for example. For example, E-frames that have images and other data from various types of sensors such as the camera 300b, LIDAR 300c, GPS 300d, and so forth, in the payloads thereof, are transmitted with the hub 200 as the destination, or are broadcast, and the reception unit 210b receives these E-frames.

The transfer rule storing unit 231 stores transfer rule information that has been decided beforehand, in a storage medium such as memory or the like. FIG. 8 illustrates an example of transfer rule information. The transfer rule information correlates information of transfer sources and information of transfer destinations (addressees), as illustrated in FIG. 7. The example in FIG. 7 shows that in a case where a CAN frame of CAN-ID 0x100 or 0x101 is received from CAN bus 1, which indicates the bus 30a, the hub 200 should transfer data that is the content of the CAN frame to a destination that is a device identified by MAC address "00:11:22:33:44:55" on the information system network 2. This also shows that in a case where a CAN frame of CAN-ID 0x102 is received from CAN bus 1, the hub 200 should transfer data that is the content of the CAN frame to a destination that is a device identified by MAC address "00:12:23:34:45:56" on the information system network 2. This also shows that in a case of having received an E-frame of which the transmission source MAC address is "00:11:22:33:44:55", the hub 200 should attach a CAN-ID "0x300" to the data that is the content of that E-frame, and transfer with the CAN bus 1 as the destination.

The selecting unit 230 is configured including a transfer data generating unit 233. The selecting unit 230 selects whether the destination of data that is the content of one of the reception buffer 220a and reception buffer 220b is the control system network 1 or the information system network 2, based no transfer rule information. For example, attaching a transmission source MAC address or destination MAC address in the header of an E-frame that has been received, to data stored in a reception buffer based on the E-frame, enables the selecting unit 230 to select the destination of the data by the transmission source MAC address or destination MAC address, and transfer rule information. Also, attaching a CAN-ID of a CAN frame that has been received to data stored in a reception buffer based on the CAN frame enables the selecting unit 230 to select the destination of the data from the CAN-ID and the transfer rule information.

In a case of having selected the control system network 1 as the destination of data that is the content of one of the reception buffer 220a and reception buffer 220b, the selecting unit 230 generates data to be transferred (transmitted) by the transfer data generating unit 233 based on that data and stores it in the transmission buffer 240a (control system data transmission buffer), and in a case of having selected the information system network 2, generates data to be transferred (transmitted) by the transfer data generating unit 233 based on that data and stores it in the transmission buffer 240b (information system data transmission buffer). The transfer data generating unit 233 can generate data the same as the data that is the content of the reception buffer, for example, as data to be transmitted. In a case where the control system network 1 has been selected as the destination of data that is the content of the information system data reception buffer, but the data is of a large size that cannot be stored in the data field of a CAN frame, the transfer data generating unit 233 can split that data into multiple data (data of a size that can be stored in the data field of a CAN frame), generate the multiple data as the result of splitting as data to be transmitted, and store in the control system data transmission buffer. At the time of storing data in the transmission buffer, the transfer data generating unit 233 can attach information indicating the destination and so forth (transfer destination information in the transfer rule information, etc.) to that data. Note that transferring (relaying) of frames by the hub 200 is reception and transmission of data (information) relating to frames, and can involve conversion of communication method, frame format, and so forth, corresponding to the communication protocol used at the transmission path that is the transfer destination. The hub 200 also can transmit one or multiple frames to one or multiple transmission paths in accordance with one or multiple frames received from one or multiple transmission paths, as transfer of frames among transmission paths.

When selecting the destination of data each time reading out data from one of the reception buffer 220a and reception buffer 220b, and reading out the data, the selecting unit 230 performs priority readout control, where the contents of a priority reception buffer that is one of the control system data reception buffer and information system data reception buffer are read out with higher propriety than the contents a non-priority reception buffer that is the other buffer, based on priority information set in the degree-of-priority setting unit 260 (e.g., information for identifying the priority reception buffer from which readout should be performed with priority, or the like). The degree-of-priority setting unit 260 stores priority information in a region of a storage medium such as memory. Note that in one example of the present embodiment, priority information is set at the degree-of-priority setting unit 260 indicating that data of the control system data reception buffer should be read out with priority over the information system data reception buffer. In a case where data has been read out from the reception buffers 220a and 220b, that data is deleted from the reception buffer.

The transmission unit 250 is configured including a frame constructing unit 251 that constructs frames in accordance with the communication protocols corresponding to each of the control system network 1 and information system network 2. The transmission unit 250 transmits the yet-to-be-transmitted data in the transmission buffer 240a (control system data transmission buffer), and the yet-to-be-transmitted data in the transmission buffer 240b (information system data transmission buffer). The transmission unit 250 uses the frame constructing unit 251 to transmit the data to the network to which it should be transmitted, included in a frame corresponding to the network to which it should be transmitted. The network to which the data in the system data transmission buffer should be transmitted is the information system network 2, and the network to which the data in the control system data transmission buffer should be transmitted normally is the control system network 1, but in a case where predetermined exception conditions are satisfied such that transmission cannot be performed to the control system network 1 (e.g., a case where an abnormality has been detected in at least part of the control system network 1 or the like), this is the information system network 2. That is to say, the transmission unit 250 performs transmission of data in the information system data transmission buffer by sending out E-frames including that data to the information system network 2. In a case where predetermined exception conditions are not satisfied, the transmission unit 250 performs transmission of CAN frames including that data in the control system data transmission buffer by sending out onto the bus 30a of the control system network 1, and in a case where the predetermined exception conditions are satisfied, performs transmission of E-frames including that data by sending out onto the information system network 2. CAN frames including data have been generated by, for example, including data to be sent out to the bus 30a by the transmission unit 250 in the data field of a CAN frame, and including the CAN-ID that had been attached to the data in the transmission buffer in the ID field of the CAN frame. An E-frame including data to be sent out to the cable 20f by the transmission unit 250, is an E-frame where the payload includes, for example, identification flag information representing whether or not data to be transmitted to the control system network 1 is included, the identification flag information indicating that data to be transmitted to the control system network 1 is not included, and information system data, with the MAC address that had been attached to the information system data in the transmission buffer set as the destination MAC address. An E-frame including data to be sent out to the cable 20f by the transmission unit 250, is an E-frame where the payload includes, for example, identification flag information representing whether or not data to be transmitted to the control system network 1 is included, the identification flag information indicating that data to be transmitted to the control system network 1 is included, and control system data, with a particular MAC address set beforehand (e.g., a broadcast address, etc.) set as the destination MAC address. Note that in E-frames transmitted by the transmission unit 250, the identification flag information may be provided in the type in the header or the like, instead of the payload, and for example, a bit for identifying whether or not a global MAC address in the destination MAC address in the header may be used as identification flag information, and set to a value not that of a global MAC address, thereby indicating that control system data to be transmitted to the control system network 1 is included.

In a case of transmitting data of each of the control system data transmission buffer and information system data transmission buffer, the transmission unit 250 performs priority transmission control, where the yet-to-be-transmitted data of a priority transmission buffer that is one of the control system data transmission buffer and information system data reception buffer are transmitted with higher propriety than yet-to-be-transmitted data of a non-priority transmission buffer that is the other buffer, based on priority information set in the degree-of-priority setting unit 260 (e.g., information for identifying the priority transmission buffer from the control system data transmission buffer and information system data transmission buffer, regarding which data should be transmitted with priority, or the like). The priority information is information where a priority transmission buffer and priority reception buffer have been correlated, such as for example, the priority reception buffer is the control system data reception buffer in a case where the priority transmission buffer is the control system data transmission buffer, and the priority reception buffer is the information system data reception buffer in a case where the priority transmission buffer is the information system data transmission buffer. Note that in one example of the present embodiment, priority information is set at the degree-of-priority setting unit 260 indicating the control system data transmission buffer is the transmission buffer of which data should be transmitted with priority over the information system data transmission buffer. In a case where data has been transmitted from the transmission buffers 240a and 240b by the transmission unit 250, that data is deleted from the transmission buffer, for example.

The degree-of-priority setting unit 260 sets and stores priority information indicating which of the control system data reception buffer (or control system data transmission buffer) and information system data reception buffer (or information system data transmission buffer) to give priority to (which has higher priority). Note that the priority information may be set such that the buffers have the same degree of priority. The degree-of-priority setting unit 260 may set the priority information to be that set beforehand, or may set the priority information so as to be that based on the state of the vehicle 9 in the past, processing results of onboard devices, and so forth.

1.5 Operations of X-ECU 100

Figure 9:
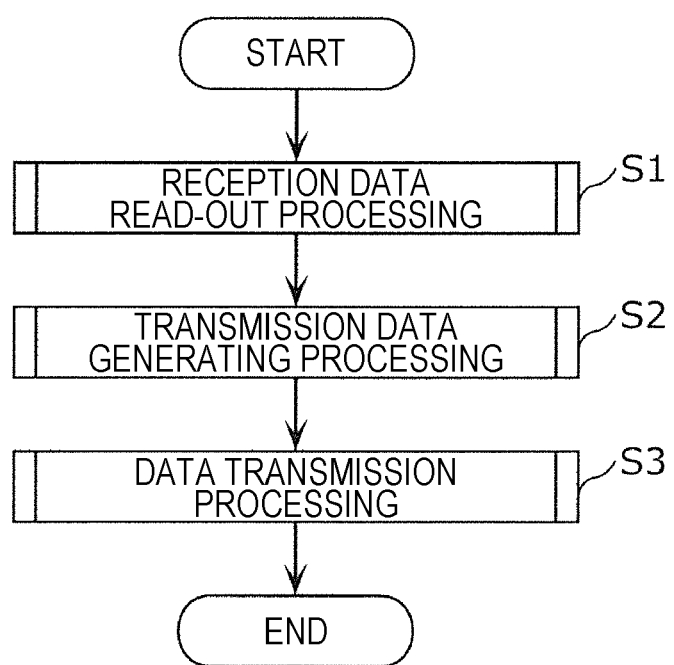
FIG. 9 is a flowchart illustrating an example of data processing by the X-ECU according to the first embodiment.

FIG. 9 is a flowchart illustrating an example of data processing by the X-ECU 100. The X-ECU 100 sequentially stores the contents of frames sequentially received by the reception unit 110a and reception unit 110b from transmission paths in the reception buffer 120a (control system data reception buffer) and reception buffer 120b (information system data reception buffer). The generating unit 130 and transmission unit 150 perform the data processing illustrated in FIG. 9, in parallel with the reception and storage by the reception units 110a and 110b. As this data processing, the X-ECU 100 performs reception data readout processing (step S1) and transmission data generating processing (step S2) primarily by the generating unit 130, and data transmission processing (step S3) primarily by the transmission unit 150. This data processing is performed repetitively.

First, the reception data readout processing (step S1) will be described with reference to FIG. 10. Assumption will be made here that data stored in the reception buffers 120a and 120b by the reception units 110a and 110b is deleted from the reception buffers upon being read out by the generating unit 130.

The generating unit 130 of the X-ECU 100 confirms whether data is stored in the control system data reception buffer (step S101), and confirms whether data is stored in the information system data reception buffer (step S102). In a case where no data is stored in either of the reception buffers, the generating unit 130 repeats the processing of steps S101 and S102 (step S103).

If data is stored in both of the control system data reception buffer and information system data reception buffer (step S104), the generating unit 130 confirms whether there is data present in the reception buffers that has not been read out for a certain amount of time (step S105). Confirmation in step S105 is performed based on calculating the unread time of data (time not read out), and confirming whether or not the unread time has exceeded a certain threshold value, for example.

In a case where there is no data that has not been read out for a certain amount of time as the result of the confirmation in step S105, the generating unit 130 references priority information, confirms readout from which reception buffer should be given priority, and in a case where the degree of priority is higher for readout from the control system data reception buffer (step S106) data is read out from the control system data reception buffer (step S107). In a case where the degree of priority is higher for readout from the information system data reception buffer (step S108), the generating unit 130 reads out data from the information system data reception buffer (step S109). In a case where the degree of priority is the same, the generating unit 130 reads out the oldest data of the data in both reception buffers (step S110). Note that in an example where the priority information is set such that readout is performed from the control system data reception buffer with priority (i.e., the control system data reception buffer is set as a priority reception buffer where the degree of priority is high, and the information system data reception buffer is set as a non-priority reception buffer where the degree of priority is low), the generating unit 130 reads out data from the control system data reception buffer in step S107 in a case of having confirmed in step S105 that there is no data that has not been read out for a certain amount of time.

In a case where there is data that has not been read out for a certain amount of time as the result of the confirmation in step S105, the generating unit 130 reads out that data (step S110). Also, in a case where confirmation is made in step S104 that data is stored in only one of the control system data reception buffer and information system data reception buffer, the generating unit 130 reads out the oldest data in the one reception buffer (step S110).

Although description has been made there that data read out by the generating unit 130 is deleted from the reception buffers, data may be managed in the reception buffers by a method other than deletion, as long as it can be distinguished from data that has not been read out (unread data). Regardless of which method is used to manage data, the generating unit 130 performs priority readout control where data is read out of the priority reception buffer that is one of the control system data reception buffer and information system data reception buffer with priority, as compared to the non-priority buffer that is the other. As for the priority readout control, the generating unit 130 repeatedly confirms the reception buffer 120a (control system data reception buffer) and reception buffer 120b (information system data reception buffer), and in a case where unread data exists in the control system data reception buffer and unread data exists in the information system data reception buffer when confirming, reads out the unread data in the priority reception buffer in a case where the readout time of unread data in the non-priority reception buffer does not exceed a certain threshold value, and reads out the unread data in the non-priority reception buffer in a case where the readout time of unread data exceeds the certain threshold value. Also, when confirming the reception buffers, in a case where there is unread data in the control system data reception buffer and there is no unread data in the information system data reception buffer, the generating unit 130 reads out the unread data in the information system data reception buffer. Also, when confirming the reception buffers, in a case where there is no unread data in the control system data reception buffer and there is unread data in the information system data reception buffer, the generating unit 130 reads out the unread data in the control system data reception buffer. The above-described certain threshold value may be decided based on the state of the vehicle 9 in the past, the processing results of onboard devices, and so forth. It is suitable to set the above-described certain threshold value to an appropriate time that is longer than the time required to read out one worth of data in the priority reception buffer, in order to prevent a situation where no data is read out from the non-priority reception buffer at all due to consecutive readout of data from the priority reception buffer in the priority readout control.

Figure 11:
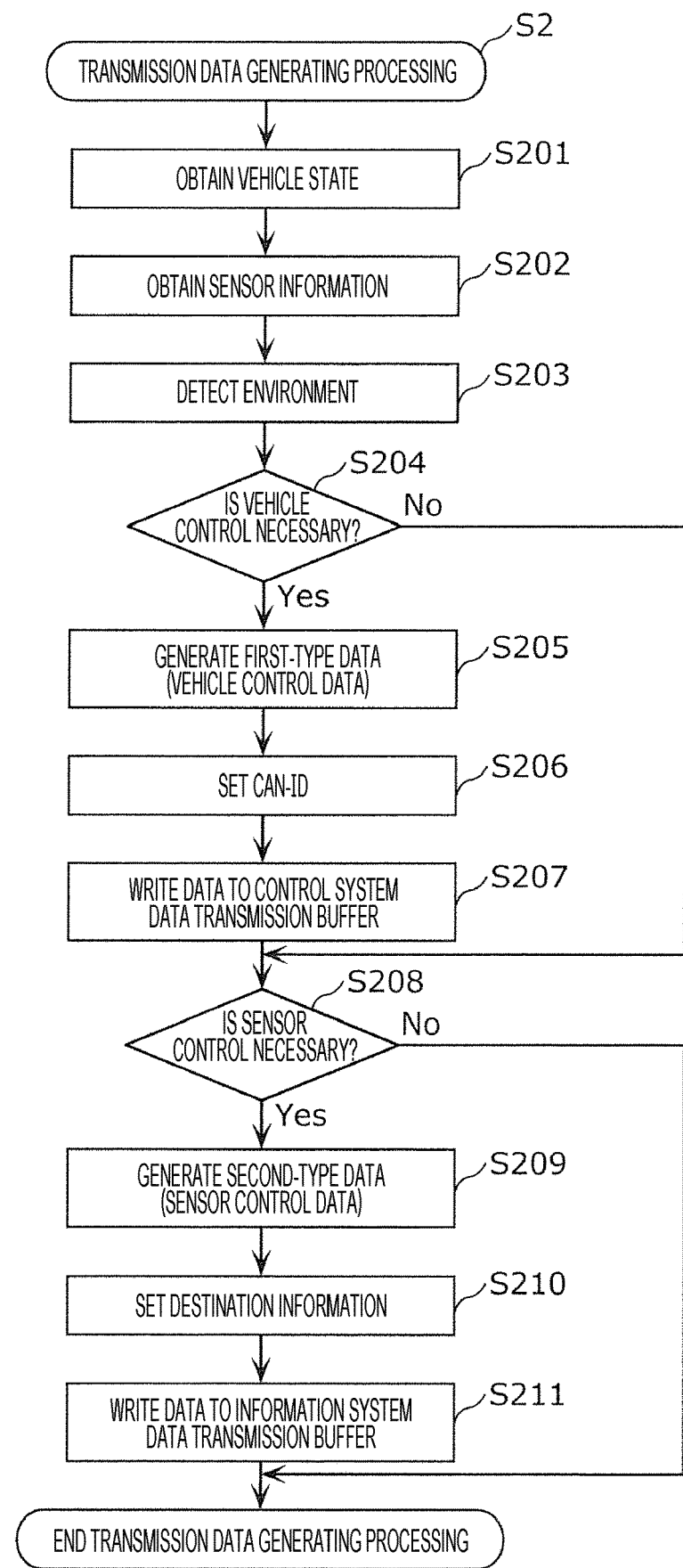
FIG. 11 is a flowchart illustrating an example of transmission data generating processing by the X-ECU according to the first embodiment.

Next, transmission data generating processing (step S2) will be described with reference to FIG. 11. The generating unit 130 obtains vehicle state (step S201), or obtains sensor information (step S202), based on data read out from one of the reception buffers. Next, the generating unit 130 performs detection regarding various types of items relating to the surrounding environment of the vehicle 9 and the state of the vehicle 9 and so forth, based on the obtained vehicle state or sensor information (step S203). Note that when performing detection in step S203 relating to the environment, based on the vehicle state and sensor information and so forth obtained based on data read out from one of the reception buffers in step S201 or step S202, the generating unit 130 may further perform detection by referencing one or multiple data read out from the reception buffers during a certain previous time period (e.g., within several seconds) or the like.

Next, the generating unit 130 judges whether or not traveling control of the vehicle 9 is necessary (step S204), based on the detection results in step S203. In a case of having judged that traveling control of the vehicle 9 is necessary, the generating unit 130 generates vehicle control data as control system data (first-type data) (step S205), sets a CAN-ID that can operate as a degree of priority of a CAN frame, to be attached to this vehicle control data (step S206), and writes this control system data to the transmission buffer 140a (control system data transmission buffer) (step S207). In a case of having judged that traveling control of the vehicle 9 is unnecessary in step S204, the generating unit 130 skips the processing of steps S205 through S207.

Next, the generating unit 130 judges whether or not control of sensors installed in the vehicle 9 is necessary, based on the detection results in step S203 (step S208). In a case of having judged that sensor control is necessary, the generating unit 130 generates sensor control data as information system data (second-type data) (step S209), sets destination information such as a MAC address or the like serving as the destination of the sensor control data, to be attached to this sensor control data (step S210), and writes this information system data to the transmission buffer 140b (information system data transmission buffer) (step S211). In a case of having judged that sensor control is unnecessary in step S208, the generating unit 130 skips the processing of steps S209 through S211.

Next, the data transmission processing (step S3) will be described with reference to FIGS. 12 and 13. When the data stored in the transmission buffers 140a and 140b is read out by the transmission unit 150 and transmitted, the data is deleted from the transmission buffers.

The transmission unit 150 of the X-ECU 100 confirms whether there is data stored in the control system data transmission buffer (step S301), and confirms whether there is data stored in the information system data transmission buffer (step S302). While there is no data stored in either of the transmission buffers, the transmission unit 150 repeats the processing of step S301 and step S302 (step S303).

If data is stored in both of the control system data transmission buffer and information system data transmission buffer (step S304), the transmission unit 150 confirms whether there is data in the transmission buffers that has not been transmitted for a certain amount of time (step S305). Confirmation in step S305 is performed based on calculating the non-transmission time of data (time not transmitted), and confirming whether or not the non-transmission time has exceeded a predetermined threshold value, for example.

In a case where there is no data that has not been transmitted for a certain amount of time as the result of the confirmation in step S305, the transmission unit 150 references priority information, confirms transmission from which transmission buffer should be given priority, and in a case where the degree of priority to transmit the control system data, i.e., the degree of priority for transmission of data from the control system data transmission buffer, is higher (step S306), control system data is read out from the control system data transmission buffer, and the data is identified as being the object of transmission (step S307). In a case where the degree of priority to transmit the information system data, i.e., the degree of priority for transmission of data from the information system data transmission buffer, is higher (step S308), the transmission unit 150 reads out information system data from the information system data transmission buffer, and identifies this data as being the object of transmission (step S309). In a case where the degree of priority is the same, the transmission unit 150 reads out the oldest data of the data in both transmission buffers and identifies it as being the object of transmission (step S310). Note that in an example where the priority information is set such that transmission is performed from the control system data (data within the control system data transmission buffer) with priority (i.e., the control system data is set as priority type data where the degree of priority is high, and the information system data is set as a non-priority type data where the degree of priority is low, or the control system data transmission buffer is set as a priority transmission buffer where the degree of priority is high, and the information system data transmission buffer is set as a non-priority transmission buffer where the degree of priority is low), and in a case of having confirmed in step S305 that there is no data that has not been transmitted for a certain amount of time, the transmission unit 150 reads out control system data from the control system data transmission buffer, and identifies this data as being the object of transmission in step S307.

In a case where there is data that has not been transmitted for a certain amount of time as the result of the confirmation in step S305, the transmission unit 150 reads out that data and identifies as being the object of transmission (step S310). Also, in a case where confirmation is made in step S304 that data is stored in only one of the control system data transmission buffer and information system data transmission buffer, the transmission unit 150 reads out the oldest data in the one transmission buffer and identifies it as being the object of transmission (step S310).

Once data that is the object of transmission has been identified in step S307, S309, or S310, the transmission unit 150 determines whether the object of transmission is control system data or information system data (step S311), and if control system data, determines whether or not predetermined exception conditions where transmission cannot be made to the control system network 1 are satisfied (e.g., whether or not an abnormality has been detected at part of the control system network 1) (step S312).

In a case where determination is made that the predetermined exception conditions are satisfied due to an abnormality having been detected at part of the control system network 1 or the like in step S312, the transmission unit 150 constructs an E-frame including control system data identified as being the object of transmission, and transmits this E-frame to the information system network 2 (step S313). On the other hand, in a case where determination is made that the predetermined exception conditions are not satisfied in step S312, the transmission unit 150 constructs a CAN frame including the control system data that has been identified as the object of transmission, and transmits this CAN frame to the control system network 1 (step S314).

In a case where determination has been made in step S311 that the object of transmission is information system data, the transmission unit 150 constructs an E-frame including the information system data identified as being the object of transmission, and transmits this E-frame to the information system network 2 (step S315).

Although description has been made here that data read out and transmitted by the transmission unit 150 is deleted from the transmission buffers, data may be managed in the transmission buffers by a method other than deletion, as long as it can be distinguished from data that has not been transmitted (yet-to-be-transmitted data). Regardless of which method is used to manage data, the transmission unit 150 performs priority transmission control where priority type data that is one of the control system data and information system data is sent with priority, as compared to the non-priority type data that is the other. As for the priority transmission control, the transmission unit 150 repeatedly confirms the transmission buffer 140a (control system data transmission buffer) and transmission buffer 140b (information system data transmission buffer), and in a case where yet-to-be-transmitted control system data exists in the control system data transmission buffer and yet-to-be-transmitted information system data exists in the information system data transmission buffer when confirming, transmits the priority type data in a case where the non-transmission time of the non-priority type data does not exceed a predetermined threshold value, and transmits the non-priority type data in a case where the non-transmission time exceeds the predetermined threshold value. Also, when confirming the transmission buffers, in a case where there is yet-to-be-transmitted control system data in the control system data priority type buffer and there is yet-to-be-transmitted information system data in the information system data transmission buffer, the transmission unit 150 transmits the control system data. Also, when confirming the transmission buffers, in a case where there is no yet-to-be-transmitted control system data in the control system data transmission buffer and there is yet-to-be-transmitted information system data in the information system data transmission buffer, the transmission unit 150 transmits the information system data. The above-described predetermined threshold value may be decided based on the state of the vehicle 9 in the past, the processing results of onboard devices, and so forth. It is suitable to set the above-described certain threshold value to an appropriate time that is longer than the time required to transmit one worth of priority type data, in order to prevent a situation where no priority type data is transmitted at all due to consecutive transmission of priority type data in the priority transmission buffer.

1.6 Operations of Hub 200

Figure 13:
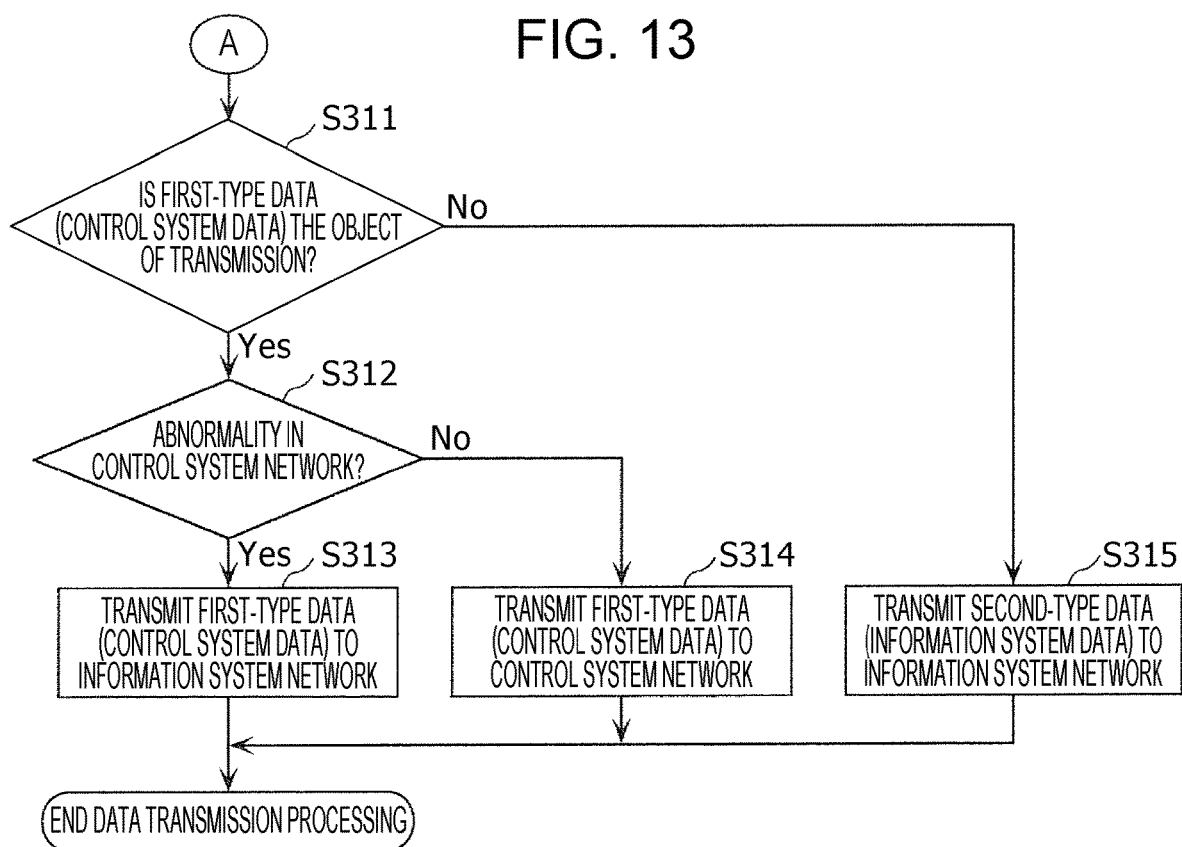
FIG. 13 is a flowchart illustrating an example of data transmission processing by the X-ECU according to the first embodiment (continuing from FIG. 12)
Figure 14:
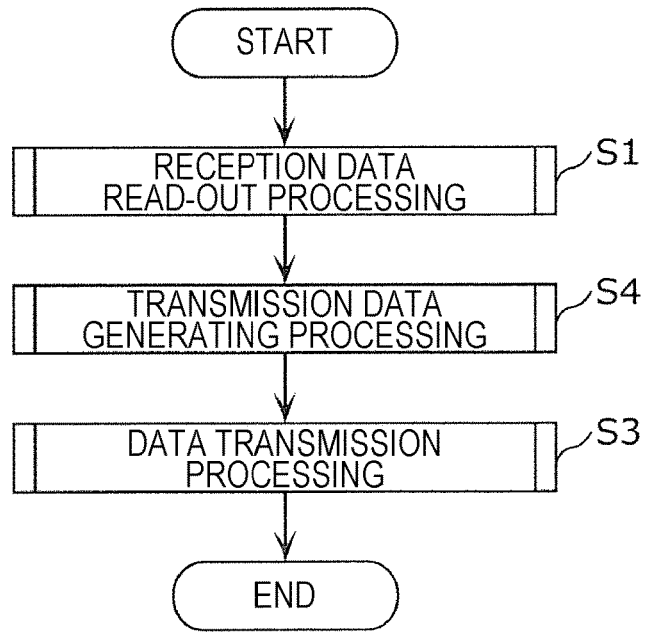
FIG. 14 is a flowchart illustrating an example of data transfer processing by the hub according to the first embodiment.

FIG. 14 is a flowchart illustrating an example of data processing by the hub 200. The hub 200 sequentially stores the contents of frames sequentially received by the reception unit 210a and reception unit 210b from transmission paths in the reception buffer 220a (control system data reception buffer) and reception buffer 220b (information system data reception buffer). The selecting unit 230 and transmission unit 250 perform the data transfer processing illustrated in FIG. 14, in parallel with the reception and storage by the reception units 210a and 210b. As this data transfer processing, the hub 200 performs reception data readout processing (step S1) and transfer data generating processing (step S4) primarily by the selecting unit 230, and data transmission processing (step S3) primarily by the transmission unit 250. This data transferring processing is performed repetitively. Note that the reception data readout processing by the selecting unit 230 is the same as the reception data readout processing by the generating unit 130 of the X-ECU 100 (FIG. 10), and the data transmission processing by the transmission unit 250 is the same as the data transmission processing by the transmission unit 150 of the X-ECU 100 (FIGS. 12 and 13), so description of this processing will be omitted as appropriate.

Once data stored in the reception buffers 220a and 220b by the reception units 210a and 210b of the hub 200 has been read out by the selecting unit 230, that data is deleted from the reception buffers.

Figure 10:
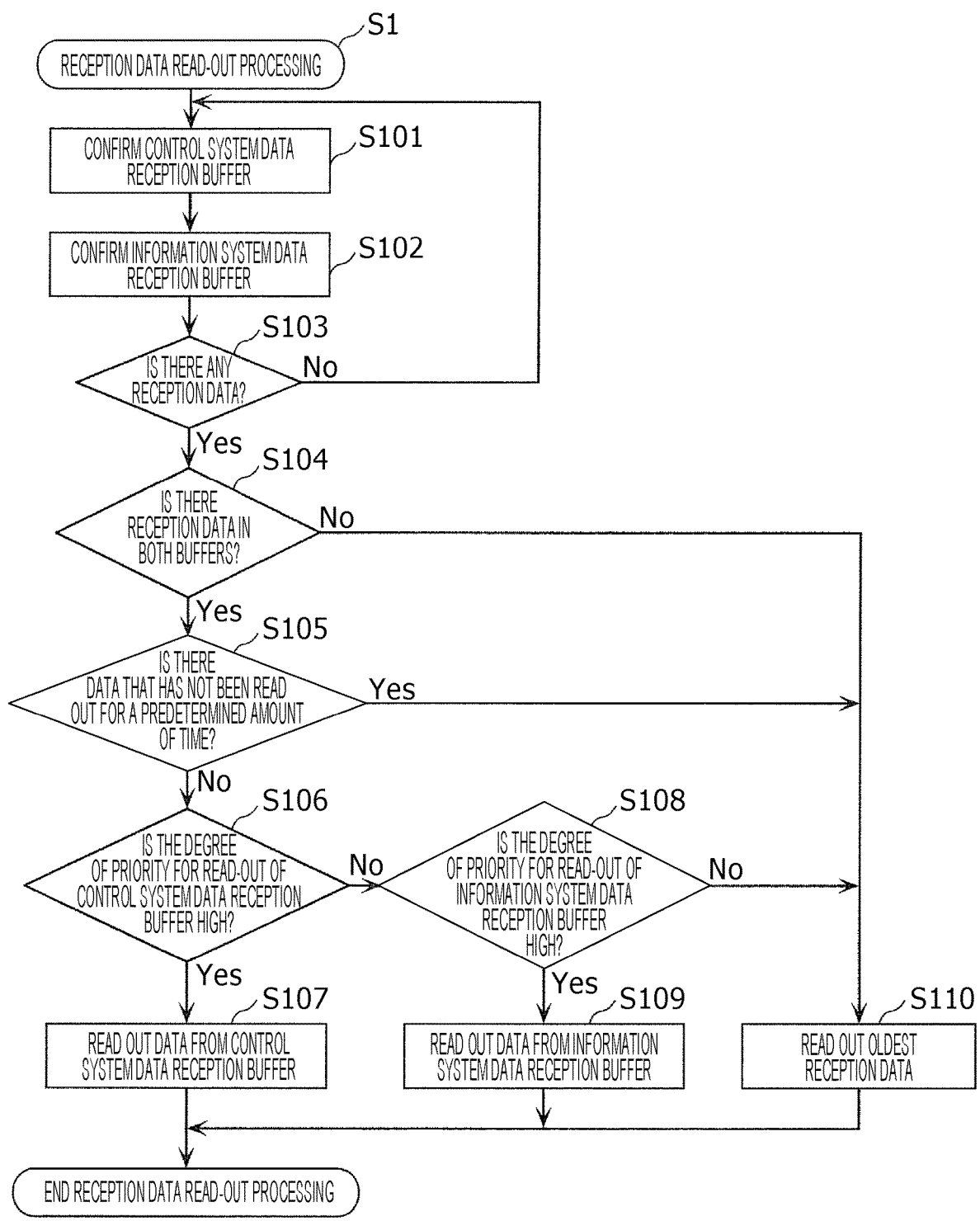
FIG. 10 is a flowchart illustrating an example of reception data readout processing by the X-ECU according to the first embodiment.

The selecting unit 230 of the hub 200 repeatedly confirms whether there is data stored in the control system data reception buffer and information system data reception buffer, as illustrated in FIG. 10 (steps S101 through S103).

When data is stored in both reception buffers (step S104), the selecting unit 230 confirms whether there is data in a reception buffer that has not been read out for a certain amount of time (step S105).

In a case where there is no data that has not been read out for a certain amount of time as the result of the confirmation in step S105, the selecting unit 230 references priority information, and in a case where the degree of priority is higher for readout from the control system data reception buffer (step S106) data is read out from the control system data reception buffer (step S107). In a case where the degree of priority is higher for readout from the information system data reception buffer (step S108), the selecting unit 230 reads out data from the information system data reception buffer (step S109).

In a case where there is data that has not been read out for a certain amount of time as the result of the confirmation in step S105, the selecting unit 230 reads out that data (step S110). Also, in a case where confirmation is made in step S104 that data is stored in only one of the control system data reception buffer and information system data reception buffer, the oldest data in the one reception buffer is read out (step S110).

Although description has been made here that data read out by the selecting unit 230 is deleted from the reception buffers, data may be managed in the reception buffers by a method other than deletion, as long as it can be distinguished from data that has not been read out (unread data). Regardless of which method is used to manage data, the selecting unit 230 performs priority readout control where data is read out from the priority reception buffer that is one of the control system data reception buffer and information system data reception buffer with priority, as compared to the non-priority reception buffer that is the other. As for the priority readout control, the selecting unit 230 repeatedly confirms the reception buffer 220a (control system data reception buffer) and reception buffer 220b (information system data reception buffer), and in a case where unread data exists in the control system data reception buffer and unread data exists in the information system data reception buffer when confirming, reads out the unread data in the priority reception buffer when the readout time of unread data in the non-priority reception buffer does not exceed a certain threshold value, and reads out the unread data in the non-priority reception buffer when the readout time exceeds the certain threshold value. Also, when confirming the reception buffers, in a case where there is unread data in the control system data reception buffer and there is no unread data in the information system data reception buffer, the selecting unit 230 reads out the unread data in the control system data reception buffer. Also, when confirming the reception buffers, in a case where there is no unread data in the control system data reception buffer and there is unread data in the information system data reception buffer, the selecting unit 230 reads out the unread data in the information system data reception buffer.

Figure 15:
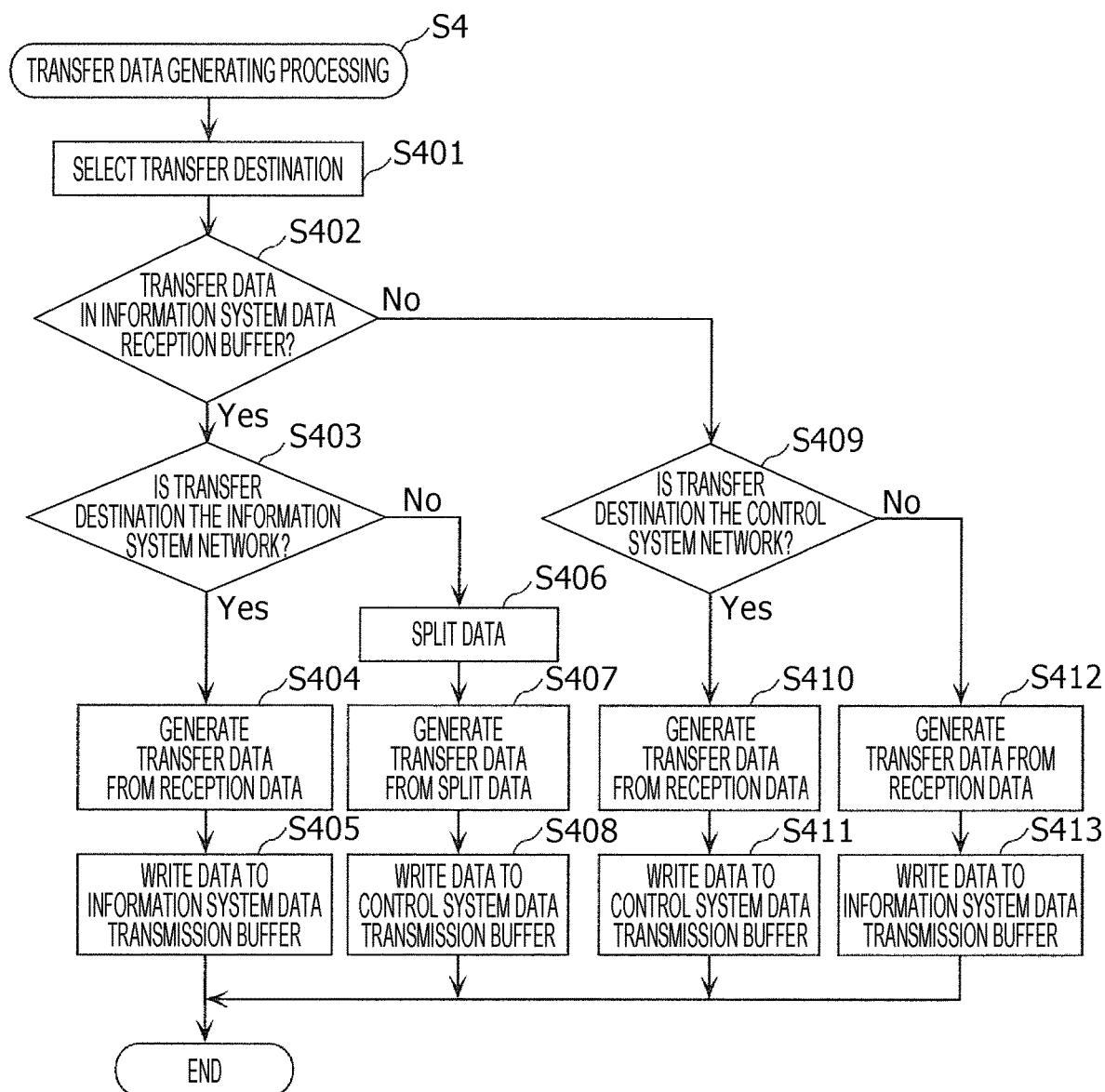
FIG. 15 is a flowchart illustrating an example of transfer data generating processing by the hub according to the first embodiment.

Next, the transfer data generating processing (step S4) by the selecting unit 230 will be described with reference to FIG. 15. Regarding the data read out form one of the reception buffers, the selecting unit 230 selects whether the destination (transfer destination) of that data is the control system network 1 or the information system network 2, based on transfer rule information (step S401).

Next, in a case where the data regarding which the destination has been selected is data read out from the information system data reception buffer (step S402), and the information system network 2 has been selected as the destination (step S403), the selecting unit 230 generates transfer data (data to be transferred) including that data, based on that data (step S404), and writes the generated data to the transmission buffer 240b (information system data transmission buffer) (step S405). In a case where the control system network 1 has been selected as the destination of data that has been read out from the information system data reception buffer in step S403, and that data is of a size that cannot be stored in a CAN data frame, the selecting unit 230 splits the data into multiple data (step S406). The selecting unit 230 then generates transfer data to include each of the data obtained as a result of the splitting (step S407), and writes each generated transfer data to the transmission buffer 240a (control system data transmission buffer) (step S408).

In a case where determination is made in step S402 that the data regarding which the destination has been selected is data read out from the control system data reception buffer, and the control system network 1 has been selected as the destination (step S409), the selecting unit 230 generates transfer data including that data, based on that data (step S410), and writes the generated data to the transmission buffer 240*a* (control system data transmission buffer) (step S411). When the destination of the data read out from the control system data reception buffer is selected to be the information system network 2 in step S409, the selecting unit 230 generates transfer data including that data (step S412), and writes the generated transfer data to the transmission buffer 240*b* (information system data transmission buffer) (step S413).

Next, the data transmission processing by the transmission unit 250 (step S3) will be described with reference to FIGS. 12 and 13. When the data stored in the transmission buffers 240*a* and 240*b* is read out by the transmission unit 250 and transmitted, the data is deleted from the transmission buffers.

The transmission unit 250 of the hub 200 repeatedly confirms whether there is data stored in the control system data transmission buffer and information system data transmission buffer (steps S301 through S303).

If data is stored in both of the transmission buffers (step S304), the transmission unit 250 confirms whether there is data in the transmission buffers that has not been transmitted for a certain amount of time (step S305).

In a case where there is no data that has not been transmitted for a certain amount of time as the result of the confirmation in step S305, the transmission unit 250 references priority information, confirms transmission of data from which transmission buffer should be given priority, and in a case where the degree of priority is higher for the control system data transmission buffer (step S306), data is read out from the control system data transmission buffer, and this data is identified as being the object of transmission (step S307). In a case where the degree of priority is higher for the information system data transmission buffer (step S308), the transmission unit 250 reads out data from the information system data transmission buffer, and identifies this data as being the object of transmission (step S309). Note that in an example where the priority information is set such that the control system data transmission buffer is the priority transmission buffer with a high degree of priority, and the information system data transmission buffer is the non-priority transmission buffer with a low degree of priority, and in a case of having confirmed in step S305 that there is no data that has not been transmitted for a certain amount of time, the transmission unit 250 reads out control system data from the control system data transmission buffer, and identifies this data as being the object of transmission in step S307.

In a case where there is data that has not been transmitted for a certain amount of time as the result of the confirmation in step S305, the transmission unit 250 reads out that data and identifies as being the object of transmission (step S310). Also, in a case where confirmation is made in step S304 that data is stored in only one of the control system data transmission buffer and information system data transmission buffer, the transmission unit 250 reads out the oldest data in the one transmission buffer and identifies this as being the object of transmission (step S310).

Once data that is the object of transmission has been identified in step S307, S309, or S310, the transmission unit 250 determines whether the object of transmission is data of the control system data transmission buffer or data of the information system data transmission buffer (step S311), and if data of the control system data transmission buffer, determines whether or not predetermined exception conditions where transmission cannot be made to the control system network 1 are satisfied (step S312).

In a case where determination is made that the predetermined exception conditions are satisfied due to an abnormality having been detected at part of the control system network 1 or the like in step S312, the transmission unit 250 constructs an E-frame including data identified as being the object of transmission, and transmits this E-frame to the information system network 2 (step S313). On the other hand, in a case where determination is made that the predetermined exception conditions are not satisfied in step S312, the transmission unit 250 constructs a CAN frame including the data that has been identified as the object of transmission, and transmits this CAN frame to the control system network 1 (step S314).

In a case where determination has been made in step S311 that the object of transmission is data of the information system data transmission buffer, the transmission unit 250 constructs an E-frame including the data identified as being the object of transmission, and transmits this E-frame to the information system network 2 (step S315).

Although description has been made here that data read out and transmitted by the transmission unit 250 is deleted from the transmission buffers, data may be managed in the transmission buffers by a method other than deletion, as long as it can be distinguished from data that has not been transmitted (yet-to-be-transmitted data). Regardless of which method is used to manage data, the transmission unit 250 performs priority transmission control where data is transmitted from the priority transmission buffer that is one of the control system data transmission buffer and information system data transmission buffer with priority, as compared to the non-priority transmission buffer that is the other. As for the priority transmission control, the transmission unit 250 repeatedly confirms the transmission buffer 240*a* (control system data transmission buffer) and transmission buffer 240*b* (information system data transmission buffer), and in a case where yet-to-be-transmitted data exists in the control system data transmission buffer and yet-to-be-transmitted data exists in the information system data transmission buffer when confirming, transmits the data in the priority transmission buffer in a case where the non-transmission time of the non-priority transmission buffer does not exceed a predetermined threshold value, and transmits the data in the non-priority transmission buffer in a case where the non-transmission time exceeds the predetermined threshold value. Also, when confirming the transmission buffers, in a case where there is yet-to-be-transmitted data in the control system data transmission buffer and there is yet-to-be-transmitted data in the information system data transmission buffer, the transmission unit 250 transmits the data in that control system data transmission buffer. Also, when confirming the transmission buffers, in a case where there is no yet-to-be-transmitted data in the control system data transmission buffer and there is yet-to-be-transmitted data in the information system data transmission buffer, the transmission unit 250 transmits the data in that information system data transmission buffer.

1.7 Processing Sequence by ADAS Function of X-ECU 100

Figure 16:
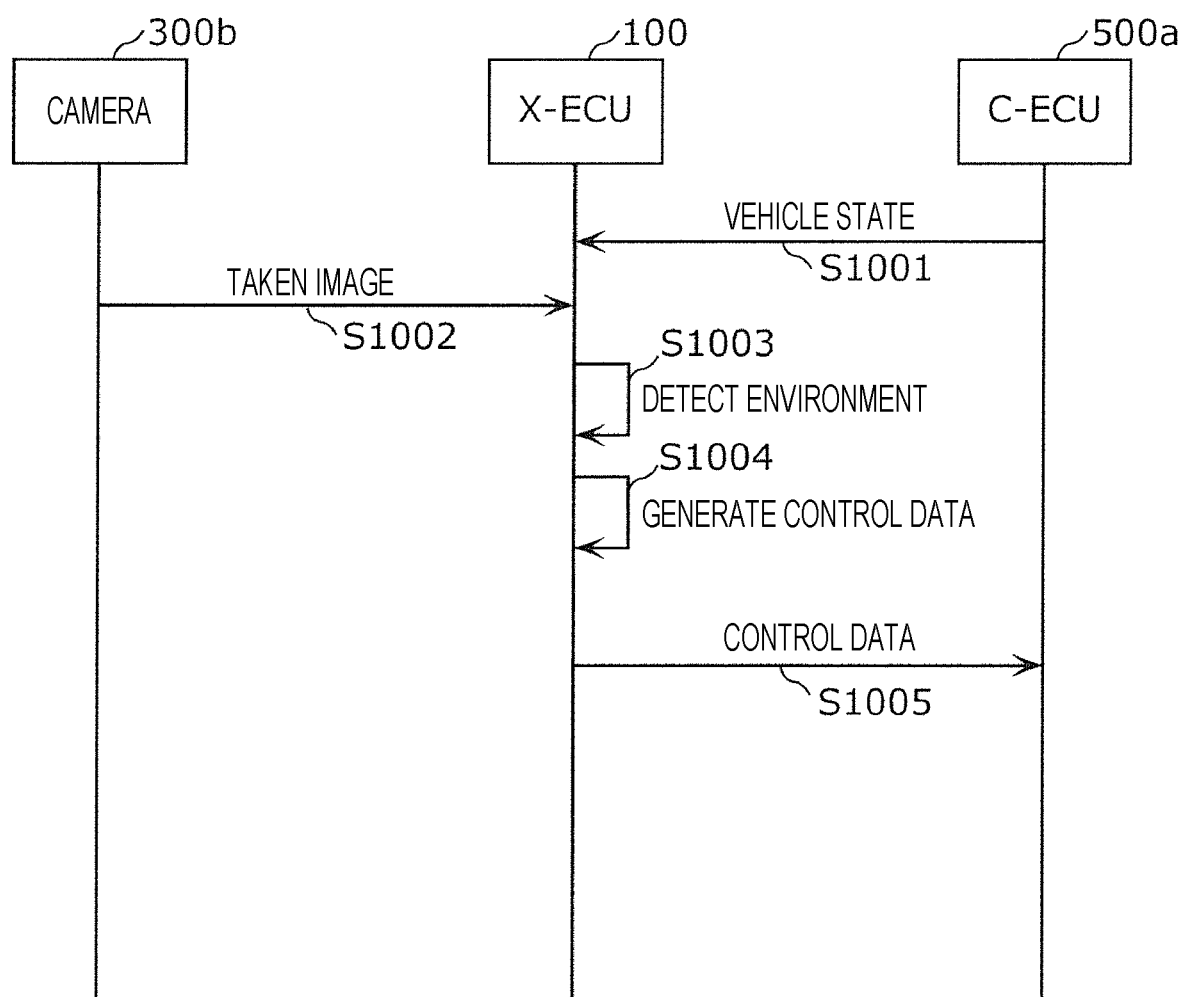
FIG. 16 is a sequence diagram illustrating an example of a processing sequence by ADAS functions of the X-ECU according to the first embodiment.

FIG. 16 illustrates an example of a processing sequence by the ADAS function of the X-ECU 100. The X-ECU 100 receives a CAN frame indicating vehicle state data that the C-ECU 500*a* has transmitted over the control system network 1 (step S1001), and receives an E-frame indicating a taken image that is sensor information, transmitted by the camera 300*b* on the information system network 2 (step S1002).

The X-ECU 100 performs detection of the surrounding environment of the vehicle 9 based on the vehicle state data and taken image (step S1003), and depending on the results of detection, generates vehicle control data for example (step S1004), and transmits the vehicle control data to the bus 30*a* of the control system network 1 (step S1005).

1.8 Communication Sequence Relating to Transfer Functions of Hub 200

Figure 17:
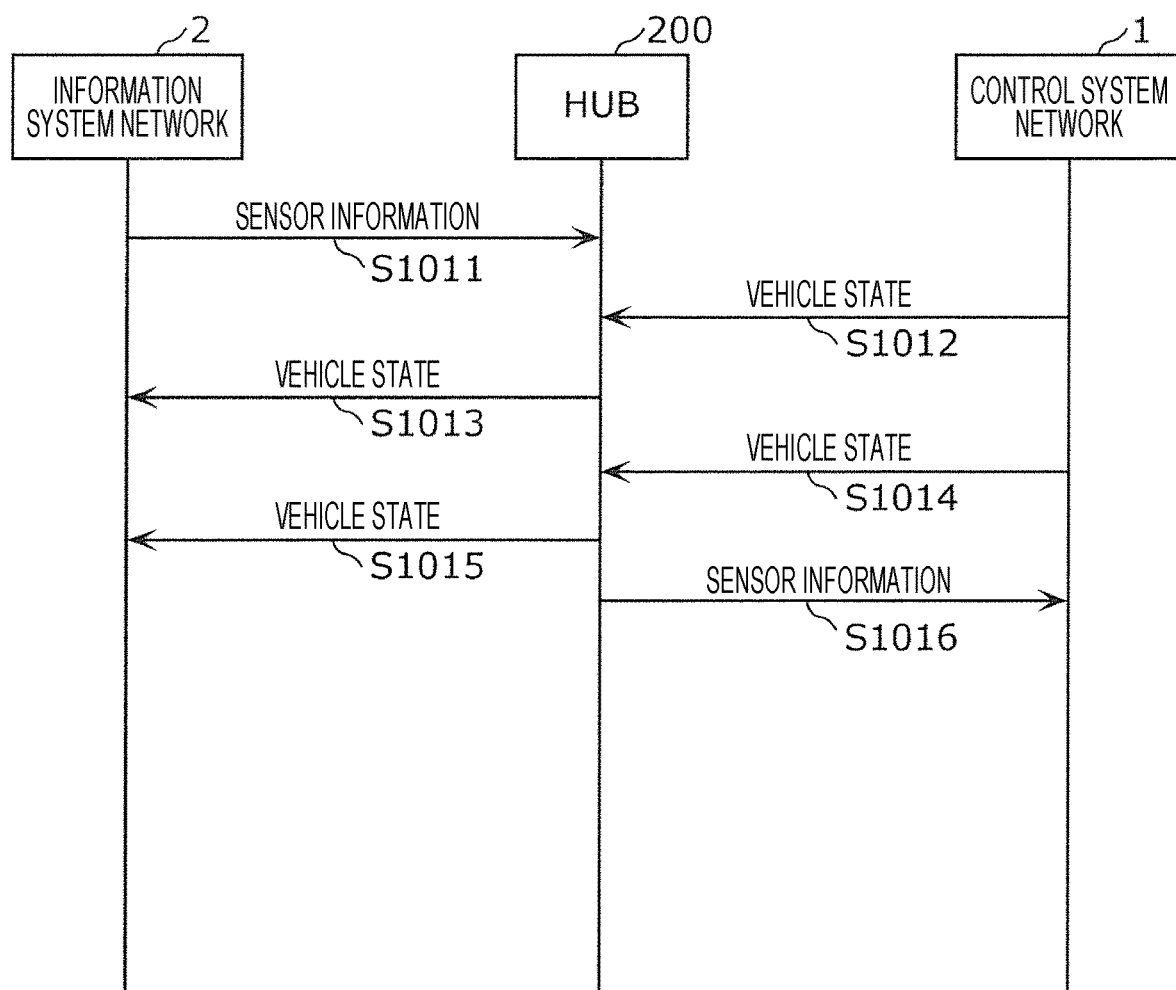
FIG. 17 is a diagram illustrating an example of a communication sequence relating to transfer functions of the hub according to the first embodiment.

FIG. 17 illustrates an example of a communication sequence relating to the transfer functions of the hub 200. Assumption will be made here that the degree of priority of the control system data reception buffer (or control system data transmission buffer) is set higher than the information system data reception buffer (or information system data transmission buffer) as priority information at the hub 200.

The hub 200 receives an E-frame including sensor information from the information system network 2 (step S1011), and receives a CAN frame including vehicle state data from the control system network 1 (step S1012).

The hub 200 confirms the reception buffers 220*a* and 220*b*, reads out vehicle state data from the reception buffer 220*a* with priority, selects the information system network 2 as being the destination, and transmits the E-frame including that vehicle state data to the information system network 2 (step S1013). The hub 200 also receives a CAN frame including the vehicle state data from the control system network 1 (step S1014).

The hub 200 confirms the reception buffers 220*a* and 220*b*, reads out vehicle state data from the reception buffer 220*a* with priority, selects the information system network 2 as being the destination, and transmits the E-frame including that vehicle state data to the information system network 2 (step S1015).

The hub 200 confirms the reception buffers 220*a* and 220*b*, and since there is no data in the reception buffer 220*a*, reads out sensor information from the reception buffer 220*b*, selects the destination as being the control system network 1, and transmits a CAN frame including that sensor information to the control system network 1 (step S1016).

1.9 Advantages of First Embodiment

In the onboard network system 10 according to the first embodiment, the X-ECU 100 that is an ECU connected to both the first network (control system network 1) and second network (information system network 2) that have different communication protocols from each other reads out data from a reception buffer from one of the networks with priority, or performs transmission of data from a transmission buffer of which the destination is one of the networks, in accordance with priority information. Also, the hub 200 connected to both networks reads out data from a reception buffer from one of the networks with priority, or performs transmission of data from a transmission buffer of which the destination is one of the networks, in accordance with priority information. Accordingly, the order of priority of processing based on data readout or transmission processing or the like can be made to correspond to the importance or the like of data transmitted over the networks. Accordingly, transmission of data relating to traveling control of the vehicle 9 can be given priority over transmission of image data and so forth, for example, and a situation where transmission of large-sized data, such as image data and so forth, adversely affects safe traveling of the vehicle 9 or the like, can be prevented.

Also, in the onboard network system 10 according to the first embodiment, the X-ECU 100 or hub 200 has a function where, in a case where determination is made that predetermined exception conditions are satisfied by an abnormality being detected at a part of the control system network 1 or the like, an E-frame including the data to be transmitted to the control system network 1 and also including identification flag information to that effect is constructed, and the E-frame is transmitted to the information system network 2. There can be cases where multiple network paths are secured in the onboard network 11, so even if there is an abnormality in part of the control system network 1, there is a possibility that the X-ECU 100 or hub 200 will be able to transmit data to the device that is the final destination via the information system network 2. As multiple relay devices connecting the control system network 1 and information system network 2 can exist in the onboard network system 10, an arrangement may be made where one of the relay devices distinguishes identification flag information of an E-frame, and in a case where the E-frame includes information that should be transmitted to the control system network 1, that E-frame may be subjected to protocol conversion and transferred to the control system network 1. Note that even in a case of having detected that there is an abnormality at part of the information system network 2, the X-ECU 100 or hub 200 do not transmit data, of which the destination is the information system network 2, to the control system network 1. The reason is that data to be transmitted to the information system network 2 is generally large in data size, so transmitting this to the control system network 1 would cause delay in transmission of vehicle control data and so forth on the control system network 1 due to congestion.

1.10 Modification of First Embodiment

Figure 18:
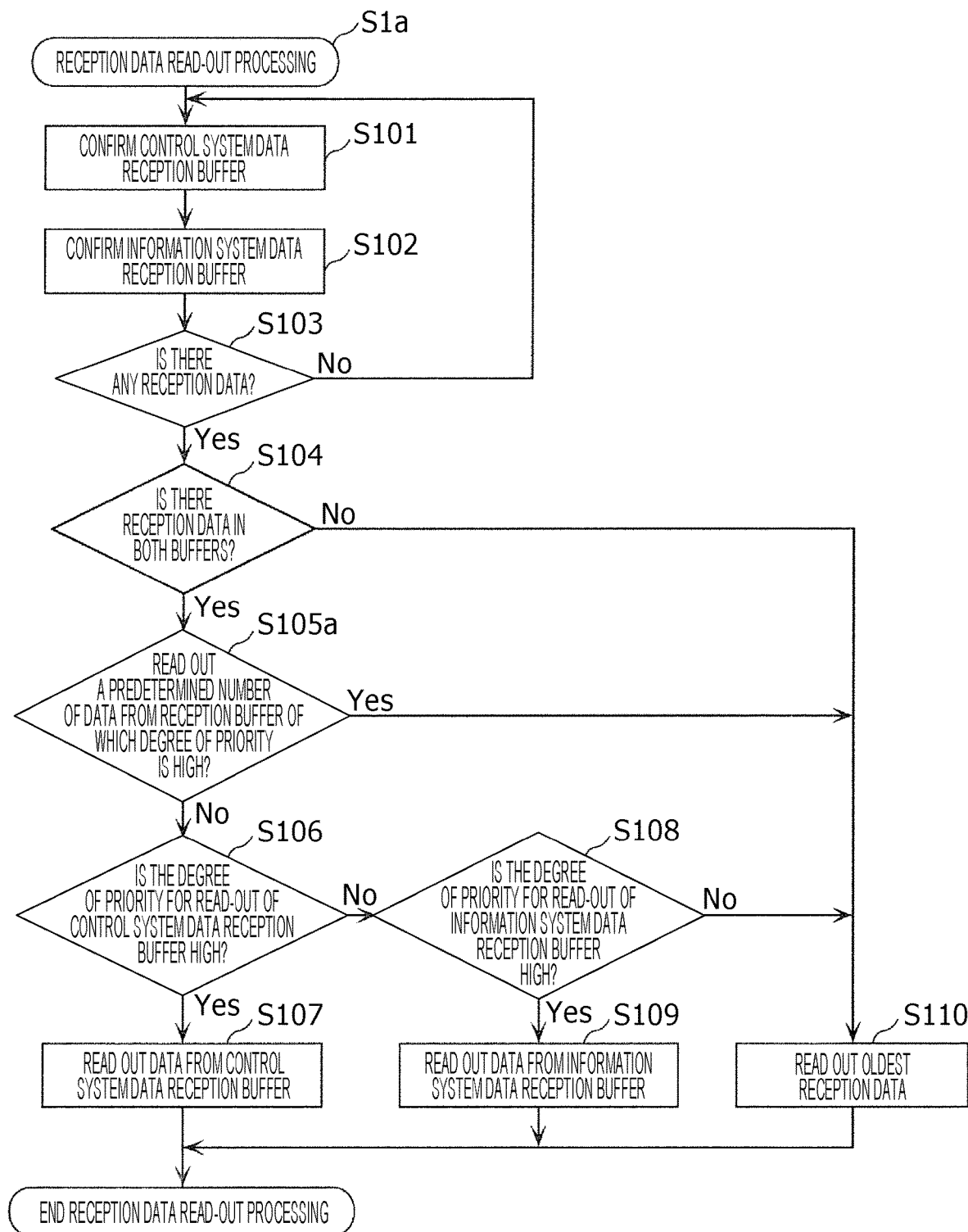
FIG. 18 is a flowchart illustrating an example of reception data readout processing according to a modification of the first embodiment.

The above-described X-ECU 100 (or hub 200) may perform reception data readout processing (step S1*a*) illustrated in FIG. 18, instead of the reception data readout processing (step S1) by the generating unit 130 (or selecting unit 230) illustrated in FIG. 10.

The reception data readout processing in FIG. 18 is a modification where the step S105 in the reception data readout processing in FIG. 10 has been changed to step S105*a*.

In step S105, the generating unit 130 (or selecting unit 230) confirms whether there is data present in the reception buffers that has not been read out for a certain amount of time, but in step S105*a*, confirmation is made regarding whether a certain quantity of data has already been read out from the reception buffer of which the degree of priority is high (priority reception buffer).

Thus, the generating unit 130 of the X-ECU 100 performs priority readout control where data is read out from a priority reception buffer that is one of the control system data reception buffer and the information system data reception buffer is given priority over a non-priority reception buffer that is the other, as follows for example. That is to say, the generating unit 130 repeatedly confirms the reception buffer 120*a* (control system data reception buffer) and reception buffer 120*b* (information system data reception buffer), and in a case where unread data is present in the control system data reception buffer and also unread data is present in the information system data reception buffer when confirming, reads a certain quantity of unread data out from the priority reception buffer, and thereafter reads out one unread data from the non-priority reception buffer. Also, in a case where unread data is present in the control system data reception buffer but there is no unread data present in the information system data reception buffer when confirming the reception buffers, the generating unit 130 reads out the unread data in the control system data reception buffer. Also, in a case where there is no unread data present in the control system data reception buffer but unread data is present in the information system data reception buffer when confirming the reception buffers, the generating unit 130 reads out the unread data in the information system data reception buffer.

Also, the selecting unit 230 of the hub 200 performs priority readout control where data is read out from a priority reception buffer that is one of the control system data reception buffer and the information system data reception buffer is given priority over a non-priority reception buffer that is the other, as follows for example. That is to say, the selecting unit 230 repeatedly confirms the reception buffer 220a (control system data reception buffer) and reception buffer 220b (information system data reception buffer), and in a case where unread data is present in the control system data reception buffer and also unread data is present in the information system data reception buffer when confirming, reads a certain quantity of unread data out from the priority reception buffer, and thereafter reads out one unread data from the non-priority reception buffer. Also, in a case where unread data is present in the control system data reception buffer but there is no unread data present in the information system data reception buffer when confirming the reception buffers, the selecting unit 230 reads out the unread data in the control system data reception buffer. Also, in a case where there is no unread data present in the control system data reception buffer but unread data is present in the information system data reception buffer when confirming the reception buffers, the selecting unit 230 reads out the unread data in the information system data reception buffer.

The above-described certain quantity may be decided based on the state of the vehicle 9 in the past, processing results of onboard devices, and so forth. The predetermined quantity is described above may be decided to be, for example, a quantity greater than one worth of the data in the priority reception buffer (e.g., a count of two or more data when expressing the quantity by a count, or a data amount that is twice or more the size of one worth when expressing the quantity by data amount), in order to prevent a situation where no data is read out at all from the non-priority reception buffer due to consecutive readout of data from the priority reception buffer in priority reception control.

Figure 12:
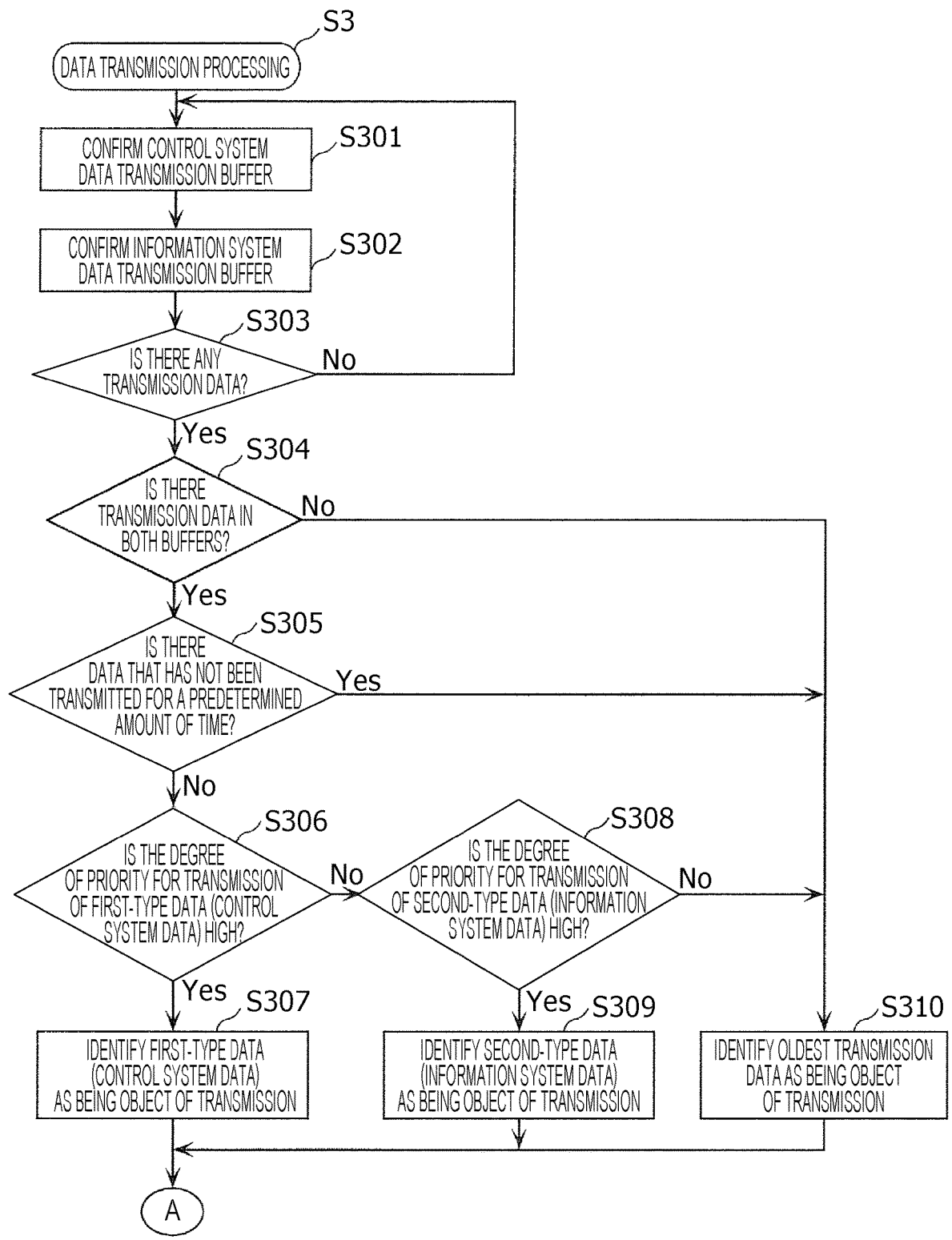
FIG. 12 is a flowchart illustrating an example of data transmission processing by the X-ECU according to the first embodiment (continuing to FIG. 13)
Figure 19:
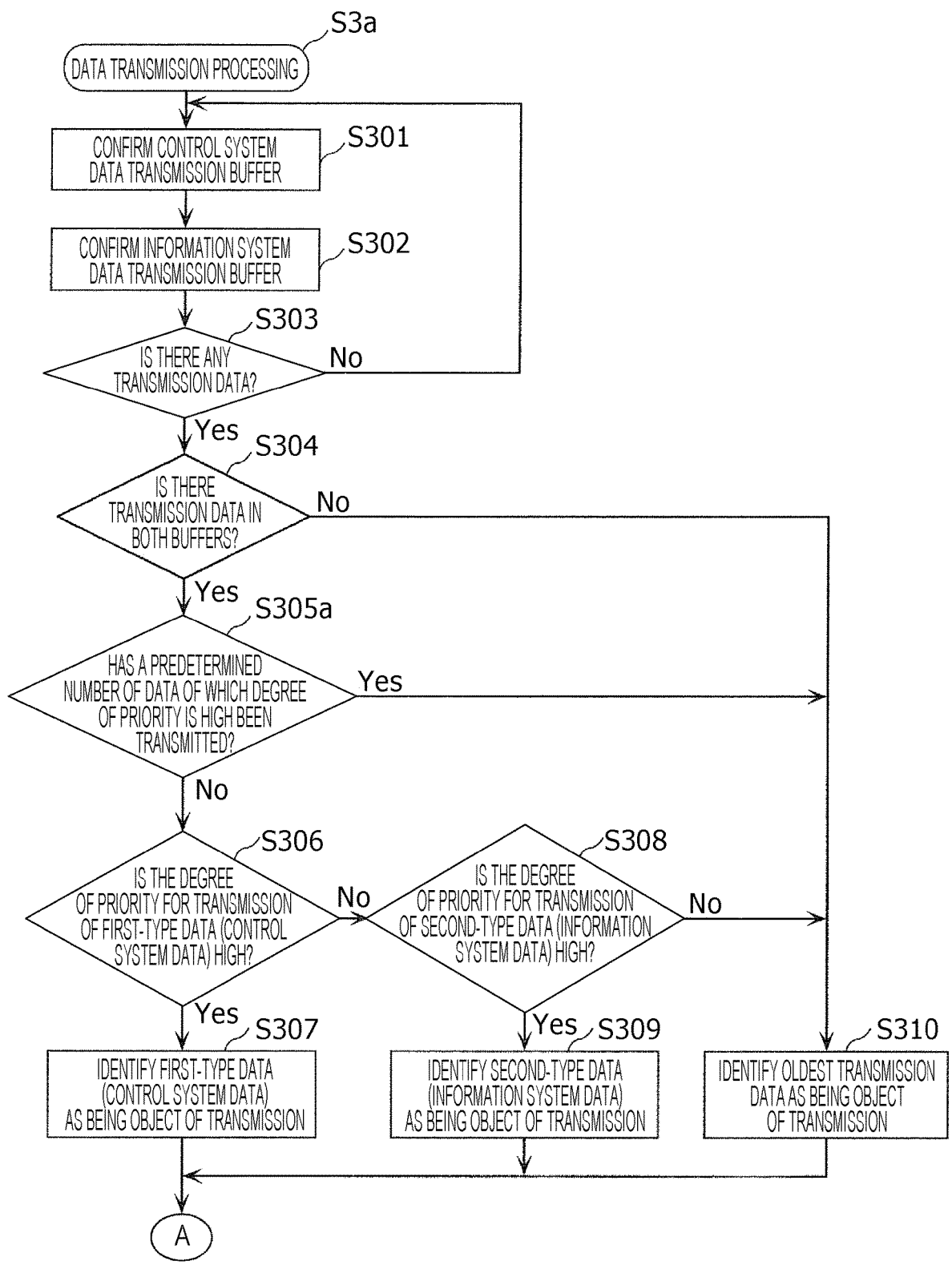
FIG. 19 is a flowchart illustrating an example of data transmission processing according to a modification of the first embodiment.

Also, the above-described X-ECU 100 (or hub 200) may perform data transmission processing (step S3a) illustrated in FIGS. 19 and 13, instead of the data transmission processing (step S3) exemplarily illustrated in FIGS. 12 and 13 that is carried out by the transmission unit 150 (or transmission unit 250).

The data transmission processing in FIGS. 19 and 13 is a modification where step S305 in the data transmission processing in FIGS. 12 and 13 has been replaced by step S305a.

In step S305, the transmission unit 150 (or transmission unit 250) confirms whether there is data present in the transmission buffers that has not been transmitted for a certain amount of time, but in step S305a, confirmation is made regarding whether a certain quantity of data (priority type data) has already been transmitted from the transmission buffer of which the degree of priority is high (priority reception buffer).

Thus, the transmission unit 150 of the X-ECU 100 performs priority transmission control where a priority type data that is one of the one of the control system data and information system data is transmitted with priority over non-priority type data that is the other, as follows for example. That is to say, the transmission unit 150 repeatedly confirms the transmission buffer 140a and transmission buffer 140b, and in a case where yet-to-be-transmitted control system data is present in the transmission buffer 140a and also yet-to-be-transmitted information system data is present in the transmission buffer 140b when confirming, transmits a certain quantity of priority type data of that control system data and information system data, and thereafter transmits one non-priority type data. Also, in a case where yet-to-be-transmitted control system data is present in the transmission buffer 140a but there is no yet-to-be-transmitted information system data present in the transmission buffer 140b when confirming the transmission buffers, the transmission unit 150 transmits that control system data. Also, in a case where there is no yet-to-be-transmitted control system data present in the transmission buffer 140a but yet-to-be-transmitted data is present in the transmission buffer 140b when confirming the transmission buffers, the transmission unit 150 transmits that information system data.

Also, the transmission unit 250 of the hub 200 performs priority transmission control where a priority type data that is one of the control system data and information system data is transmitted with priority over non-priority type data that is the other, as follows for example. That is to say, the transmission unit 250 repeatedly confirms the transmission buffer 240a and transmission buffer 240b, and in a case where yet-to-be-transmitted data is present in the transmission buffer 240a and also yet-to-be-transmitted data is present in the transmission buffer 240b when confirming, transmits a certain quantity of data in the priority transmission buffer, and thereafter transmits one data from the non-priority transmission buffer. Also, in a case where yet-to-be-transmitted data is present in the transmission buffer 240a but there is no yet-to-be-transmitted data present in the transmission buffer 240b when confirming the transmission buffers, the transmission unit 250 transmits the data that is present. Also, in a case where there is no yet-to-be-transmitted data present in the transmission buffer 240a but yet-to-be-transmitted data is present in the transmission buffer 240b when confirming the transmission buffers, the transmission unit 250 transmits the data that is present.

The above-described certain quantity may be decided based on the state of the vehicle 9 in the past, processing results of onboard devices, and so forth. The above-described predetermined quantity may be decided to be, for example, an appropriate quantity greater than one worth of the data in the priority transmission buffer (e.g., a count of two or more data when expressing the quantity by a count, or a data amount that is twice or more the size of one worth when expressing the quantity by data amount), in order to avoid a situation where no data (non-priority type data) is transmitted at all from the non-priority buffer due to consecutive transmission of data (priority type data) from the priority transmission buffer in priority transmission control.

Also, the generating unit 130 of the X-ECU 100 may change the priority readout control in the reception data readout processing (step S1) illustrated in FIG. 10 or the reception data readout processing (step S1a) illustrated in FIG. 18 as follows. That is to say, the generating unit 130 repeatedly confirms the reception buffer 120a (control system data reception buffer) and reception buffer 120b (information system data reception buffer), and in a case where unread data is present in the control system data reception buffer and also unread data is present in the information system data reception buffer when confirming, reads out the unread data in the priority reception buffer. Also, in a case where unread data is present in the control system data reception buffer but there is no unread data present in the information system data reception buffer when confirming the reception buffers, the generating unit 130 reads out the unread data in the control system data reception buffer. Also, in a case where there is no unread data present in the control system data reception buffer but unread data is present in the information system data reception buffer when confirming the reception buffers, the generating unit 130 reads out the unread data in the information system data reception buffer.

Also, the transmission unit 150 of the X-ECU 100 may change the priority transmission control in the data transmission processing (step S3) illustrated in FIGS. 12 and 13 or the data transmission processing (step S3a) illustrated in FIGS. 19 and 13 as follows. That is to say, the transmission unit 150 repeatedly confirms the transmission buffer 140a and transmission buffer 140b, and in a case where yet-to-be-transmitted control system data is present in the transmission buffer 140a and also yet-to-be-transmitted information system data is present in the transmission buffer 140b when confirming, transmits the priority type data of the control system data and information system data. Also, in a case where yet-to-be-transmitted control system data is present in the transmission buffer 140a but there is no yet-to-be-transmitted information system data present in the transmission buffer 140b when confirming the transmission buffers, the transmission unit 150 transmits the control system data. Also, in a case where there is no yet-to-be-transmitted control system data present in the transmission buffer 140a but yet-to-be-transmitted information system data is present in the transmission buffer 140b when confirming the transmission buffers, the transmission unit 150 transmits the information system data.

Also, the selecting unit 230 of the hub 200 may change the priority readout control in the reception data readout processing (step S1) illustrated in FIG. 10 or the reception data readout processing (step S1a) illustrated in FIG. 18 as follows. That is to say, the selecting unit 230 repeatedly confirms the reception buffer 220a (control system data reception buffer) and reception buffer 220b (information system data reception buffer), and in a case where unread data is present in the control system data reception buffer and also unread data is present in the information system data reception buffer when confirming, reads out the unread data in the priority reception buffer. Also, in a case where unread data is present in the control system data reception buffer but there is no unread data present in the information system data reception buffer when confirming the reception buffers, the selecting unit 230 reads out the unread data in the control system data reception buffer. Also, in a case where there is no unread data present in the control system data reception buffer but unread data is present in the information system data reception buffer when confirming the reception buffers, the selecting unit 230 reads out the unread data in the information system data reception buffer. Also, the hub 200 may perform priority transmission control where transfer of data read out from the priority reception buffer indicated by priority information (data transmission based on the data) with priority over transfer of data read out from the non-priority reception buffer.

Also, the transmission unit 250 of the hub 200 may change the priority transmission control in the data transmission processing (step S3) illustrated in FIGS. 12 and 13 or the data transmission processing (step S3a) illustrated in FIGS. 19 and 13 as follows. That is to say, the transmission unit 250 repeatedly confirms the transmission buffer 240a and transmission buffer 240b, and in a case where yet-to-be-transmitted data is present in the transmission buffer 240a and also yet-to-be-transmitted data is present in the transmission buffer 240b when confirming, transmits the data in the priority transmission buffer. Also, in a case where yet-to-be-transmitted data is present in the transmission buffer 240a but there is no yet-to-be-transmitted data present in the transmission buffer 240b when confirming the transmission buffers, the transmission unit 250 transmits the data that is present. Also, in a case where there is no yet-to-be-transmitted data present in the transmission buffer 240a but yet-to-be-transmitted data is present in the transmission buffer 240b when confirming the transmission buffers, the transmission unit 250 transmits the data that is present.

Second Embodiment

A second embodiment where the configuration of the onboard network system 10 illustrated in the first embodiment (see FIG. 2) has been partially modified will be described below.

2.1 Configuration of Onboard Network System 10a

Figure 20:
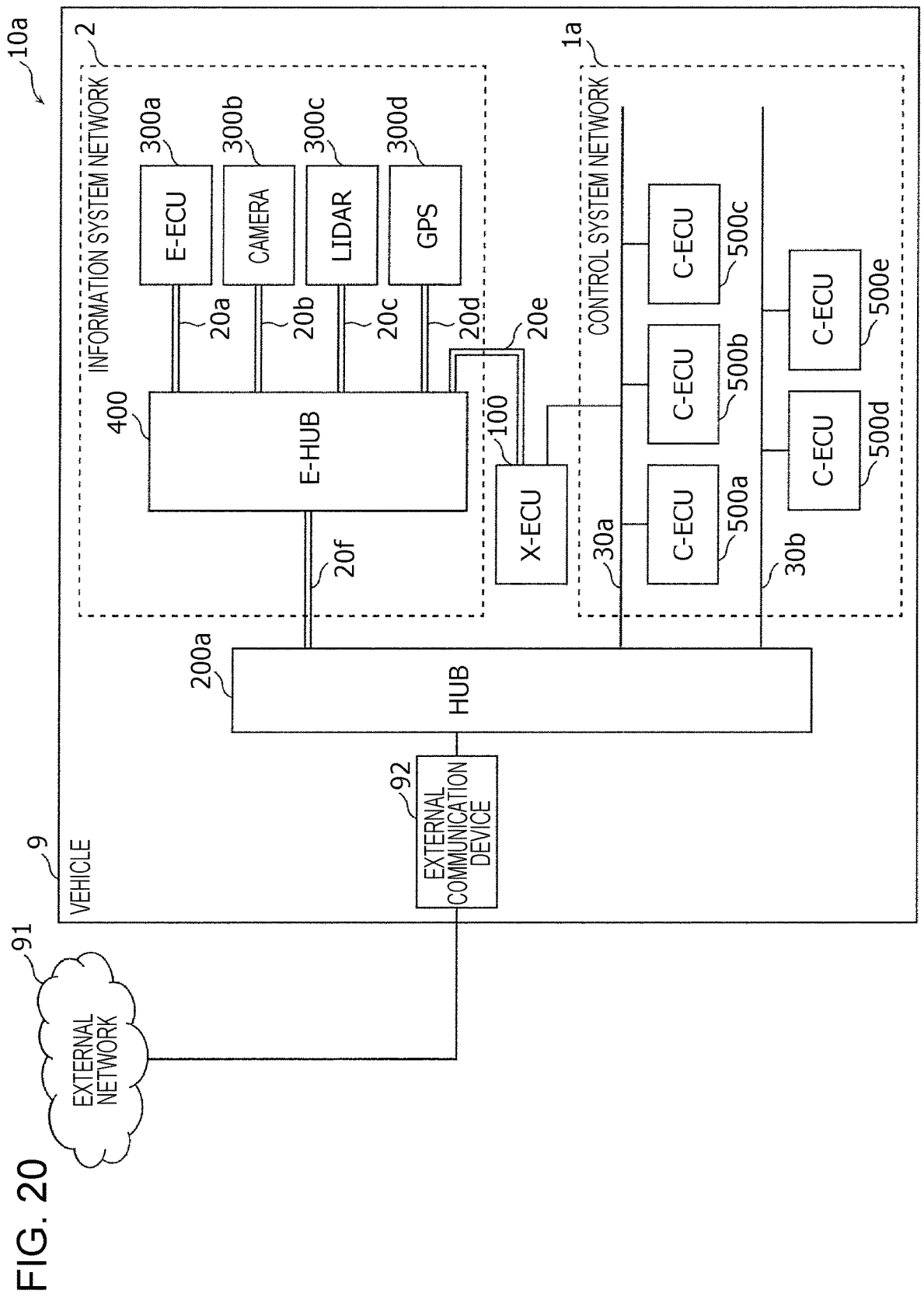
FIG. 20 is a diagram illustrating a schematic configuration of the onboard network system according to a second embodiment.

FIG. 20 is a diagram illustrating a schematic configuration of an onboard network system 10a. The hub 200 in the onboard network system 10 illustrated in the first embodiment was connected to one CAN bus of the control system network 1. In comparison with this, a hub 200a which is a partial modification of the hub 200 is connected to two busses, which are the buses 30a (CAN bus 1) and 30b (CAN bus 2) in the onboard network system 10a, as illustrated in FIG. 20. Components of the onboard network system 10a that are the same as those of the onboard network system 10 are denoted in FIG. 20 by the same symbols as in FIG. 2, and description hereof will be omitted here. Note that points regarding the onboard network system 10a that are not described in particular here are the same as with the onboard network system 10.

C-ECUs 500a through 500c are connected to the bus 30a in a control system network 1a, and C-ECUs 500d and 500e are connected to the bus 30b. The C-ECUs 500d and 500e respectively are a door control ECU directly connected to a door open/close sensor and a window control ECU directly connected to a window open/close sensor or the like, for example.

Besides having the functions of the hub 200, the hub 200a also functions as a CAN gateway, having a function of transferring a CAN frame received from one CAN bus to the other CAN bus. The C-ECUs 500a through 500e communicate with each other via the bus 30a, bus 30b, and hub 200a, for example, and exchange frames following the CAN protocol.

The hub 200a has the same configuration as the hub 200 illustrated in the first embodiment (see FIG. 7). However, the degree-of-priority setting unit 260 of the hub 200a is capable of updating the contents of priority information on the fly, in accordance with the state of the vehicle 9. For example, the degree-of-priority setting unit 260 updates the priority information in accordance with whether the vehicle 9 is traveling or stopped, based on priority control information illustrated in FIG. 21. Specifically, if the vehicle traveling state (traveling state of the vehicle 9) is a traveling state, the degree of priority of the control system data reception buffer and control system data transmission buffer is raised, and if the vehicle traveling state is a stopped state, the degree of priority of the information system data reception buffer and information system data transmission buffer is raised conversely. That is to say, the priority transmission buffer is the transmission buffer 240a (control system data transmission buffer) while the vehicle 9 is traveling, and is the transmission buffer 240b (information system data transmission buffer) when the vehicle 9 is stopped, for example. The hub 200a can distinguish whether the vehicle traveling state is traveling or stopped, from the contents (e.g., vehicle state data) of CAN frames received from one of the C-ECUs. In a stopped state, the vehicle speed is zero, for example. The data transfer processing by the hub 200a is the same as the data transfer processing by the hub 200 other than the point of being performed based on priority information that is updated on the fly. (see FIG. 10 and FIGS. 12 through 15).

Note that the hub 200a may be connected to multiple Ethernet (registered trademark) cables as transmission paths of the information system network 2, and may encompass functions the same as with the E-hub 400 in the first embodiment.

2.2 Communication Sequence Related to Transfer Functions of Hub 200a

Figures 21, 22:
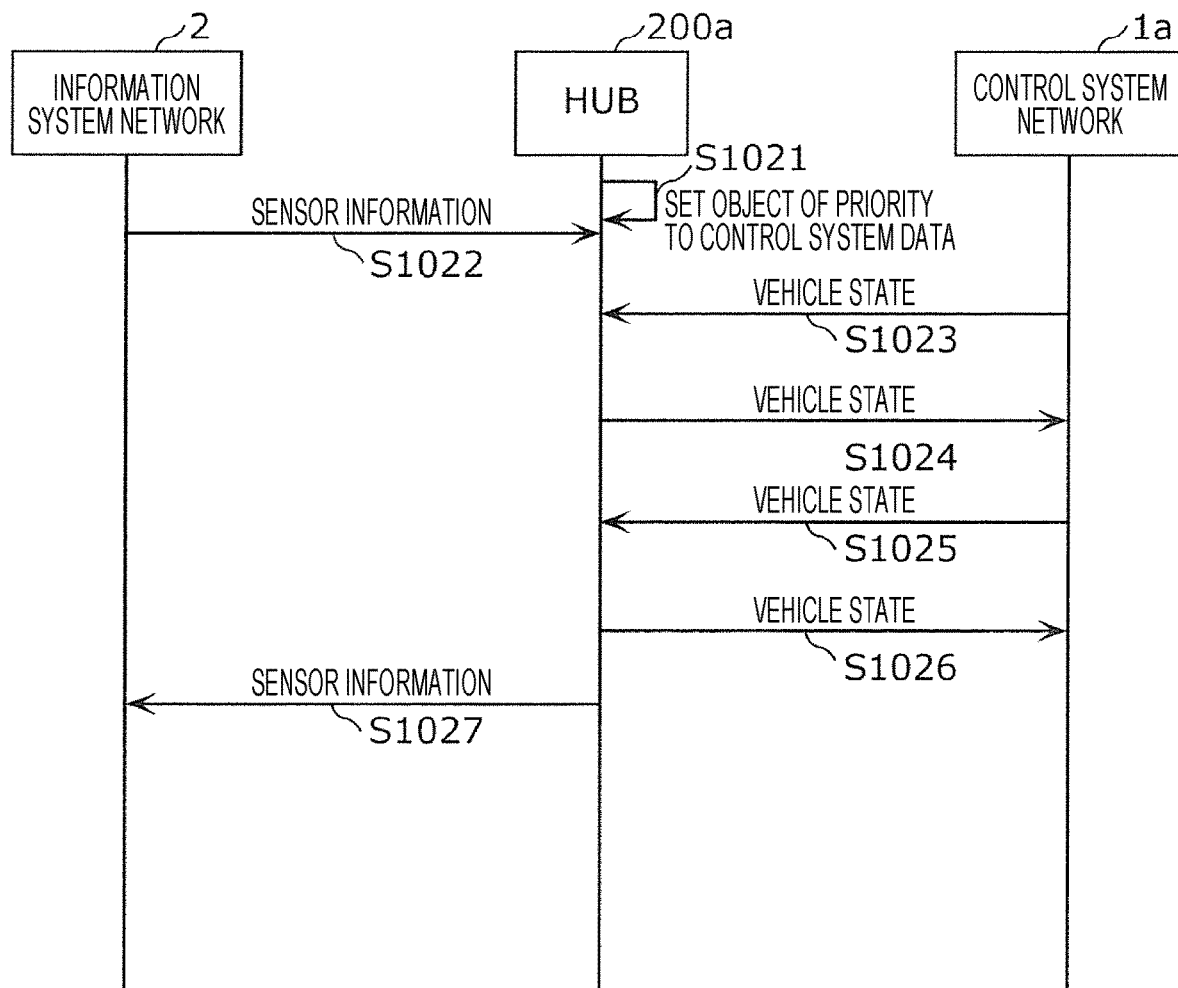
FIG. 21 is a diagram illustrating an example of degree-of-priority control information, used by a hub according to the second embodiment.
FIG. 22 is a diagram illustrating an example of a communication sequence related to transfer functions of the hub according to the second embodiment.

FIG. 22 illustrates an example of a communication sequence related to transfer functions of the hub 200a. The transfer rule information that the hub 200a stores indicates that CAN frames of vehicle state data received from the bus 30a should be transferred to the bus 30b (CAN bus 2) in this example.

Upon the vehicle 9 starting traveling, for example, the hub 200a sets priority information at the degree-of-priority setting unit 260 so that the object of priority is control system data (step S1021). Accordingly, the degree of priority of the control system data reception buffer (or control system data transmission buffer) is set higher than the information system data reception buffer (or information system data transmission buffer) in the priority information.

The hub 200a receives an E-frame containing sensor information from the information system network 2 (step S1022), and receives a CAN frame containing vehicle state data from the bus 30a (CAN bus 1), for example, of the control system network 1a (step S1023). The hub 200a then confirms the reception buffers 220a and 220b, and reads out vehicle state data from the reception buffer 220a with priority. The hub 200a selects the bus 30b of the control system network 1a as the destination of the vehicle state data read out from the reception buffer, and transmits a CAN frame including that vehicle state data to the bus 30b of the control system network 1a (step S1024). The hub 200a also receives a CAN frame including vehicle state data from the bus 30a of the control system network 1a (step S1025).

The hub 200a confirms the reception buffers 220a and 220b, reads out vehicle state data from the reception buffer 220a with priority, and in the same way selects the bus 30b of the control system network 1a as the destination, and transmits a CAN frame including that vehicle state data to the bus 30b of the control system network 1a (step S1026).

The hub 200a confirms the reception buffers 220a and 220b, and since there is no data in the reception buffer 220a, reads out the sensor information from the reception buffer 220b. An assumption will be made here that the transfer rule information indicates this sensor information has one device on the information system network 2 as the transmission source, and another device as a destination. The hub 200a then selects the information system network 2 as the destination of the sensor information that has been read out, and transmits an E-frame that includes the sensor information in the payload had and the MAC address of the destination device as the destination MAC address, to the information system network 2 (step S1027).

2.3 Advantages of Second Embodiment

In the onboard network system 10a according to the second embodiment, when transferring data, the hub 200a connected to both of the first network (control system network 1a) and second network (information system network 2) that have different communication protocols from each other reads out data from the reception buffer from one network with priority in accordance with priority information that can be updated on the fly based on the state of the vehicle 9, or performs transmission with priority from the transmission buffer for data of which the destination is one network. Accordingly, the order of priority for processing based on data readout or transmission processing or the like can be correlated with the importance of data transmitted over the networks. As a specific example, transmission of control system data relating to traveling control of the vehicle 9 is given priority over transmission of information system data such as image data or the like while the vehicle 9 is traveling, so a situation where transmission of information system data adversely affects safe traveling of the vehicle 9 or the like can be prevented. Conversely, when the vehicle 9 is stopped, transmission of information system data is given priority, so information and the like that has relatively large data amounts, such as images and so forth, can be provided to the passenger (user) of the vehicle 9 without delay, and improve the comfort of the user.

In the same way as the hub 200a, the degree-of-priority setting unit 160 may update the priority information in accordance with the state of the vehicle 9 in the X-ECU 100 as well. Accordingly, if the traveling state of the vehicle 9 on the fly is a traveling state, the degree of priority of the control system data reception buffer and control system data transmission buffer is raised in the priority information of the X-ECU 100, and if the vehicle traveling state is a stopped state, the degree of priority of the information system data reception buffer and information system data transmission buffer is set to be raised conversely. That is to say, the priority reception buffer is the control system data reception buffer while the vehicle 9 is traveling, and is the information system data reception buffer when the vehicle 9 is stopped. Also, the priority type data is the control system data while the vehicle 9 is traveling, and is information system data while the vehicle 9 is stopped.

Other Embodiments

The first and second embodiments serving as exemplary illustrations of technology relating to the present disclosure have been described above. However, the technology relating to the present disclosure is not restricted to these, and embodiments where modification, substitution, omission, and so forth has been made as appropriate are also applicable. For example, the following modifications are also included in an embodiment of the present disclosure.

Figure 23:
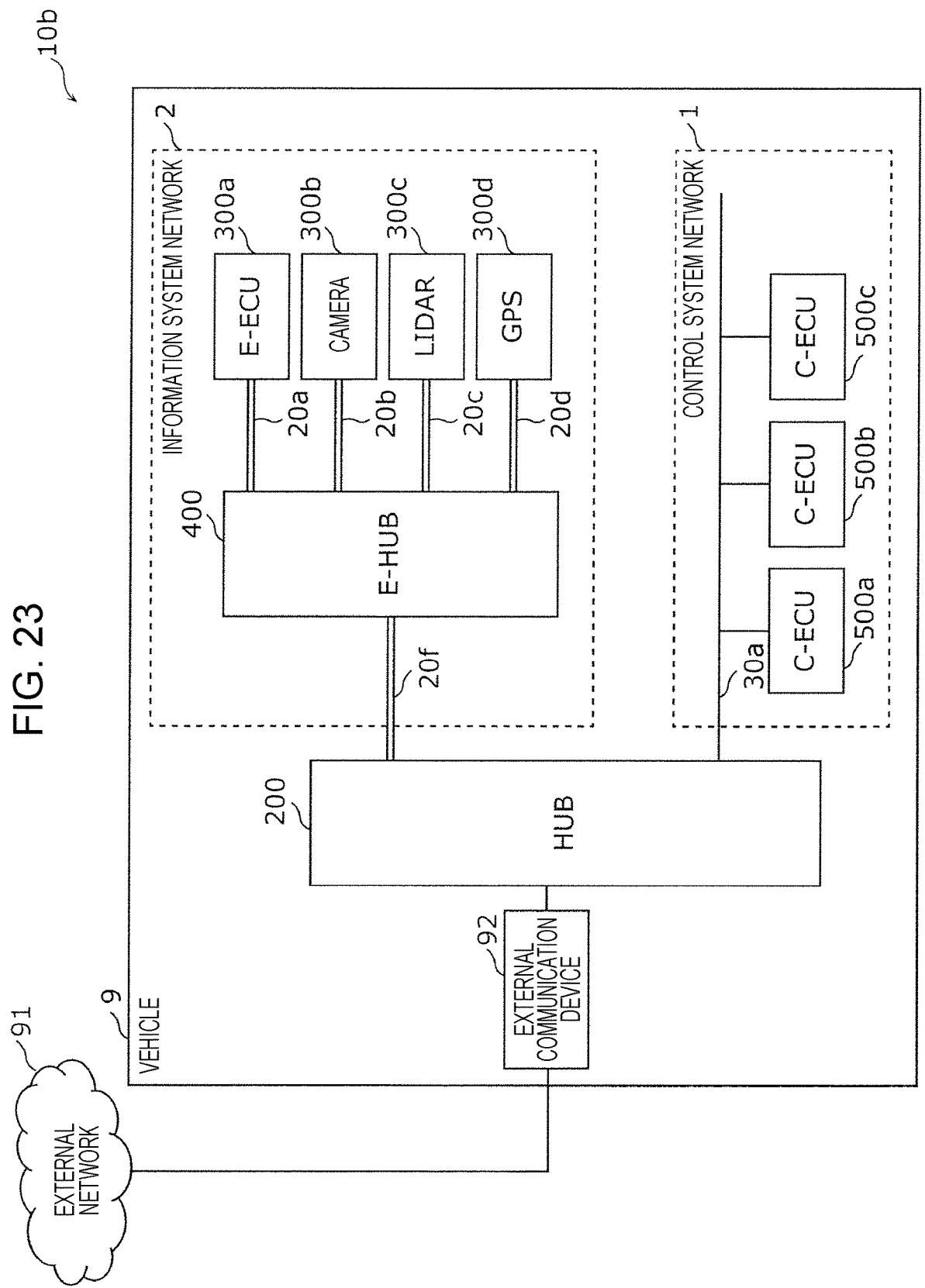
FIG. 23 is a diagram illustrating a schematic configuration of an onboard network system according to a first modification.
Figure 24:
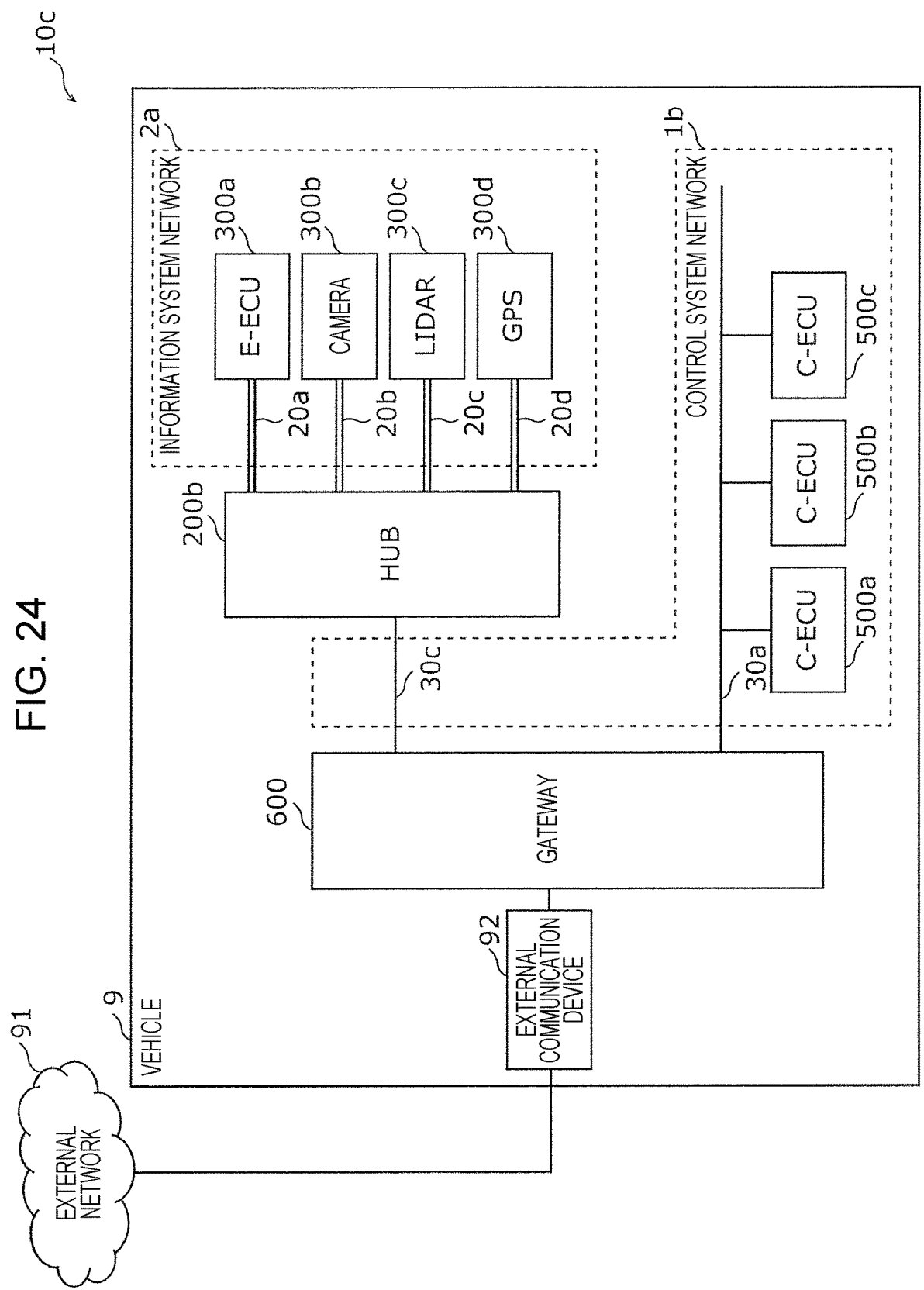
FIG. 24 is a diagram illustrating a schematic configuration of an onboard network system according to a second modification.
Figure 25:
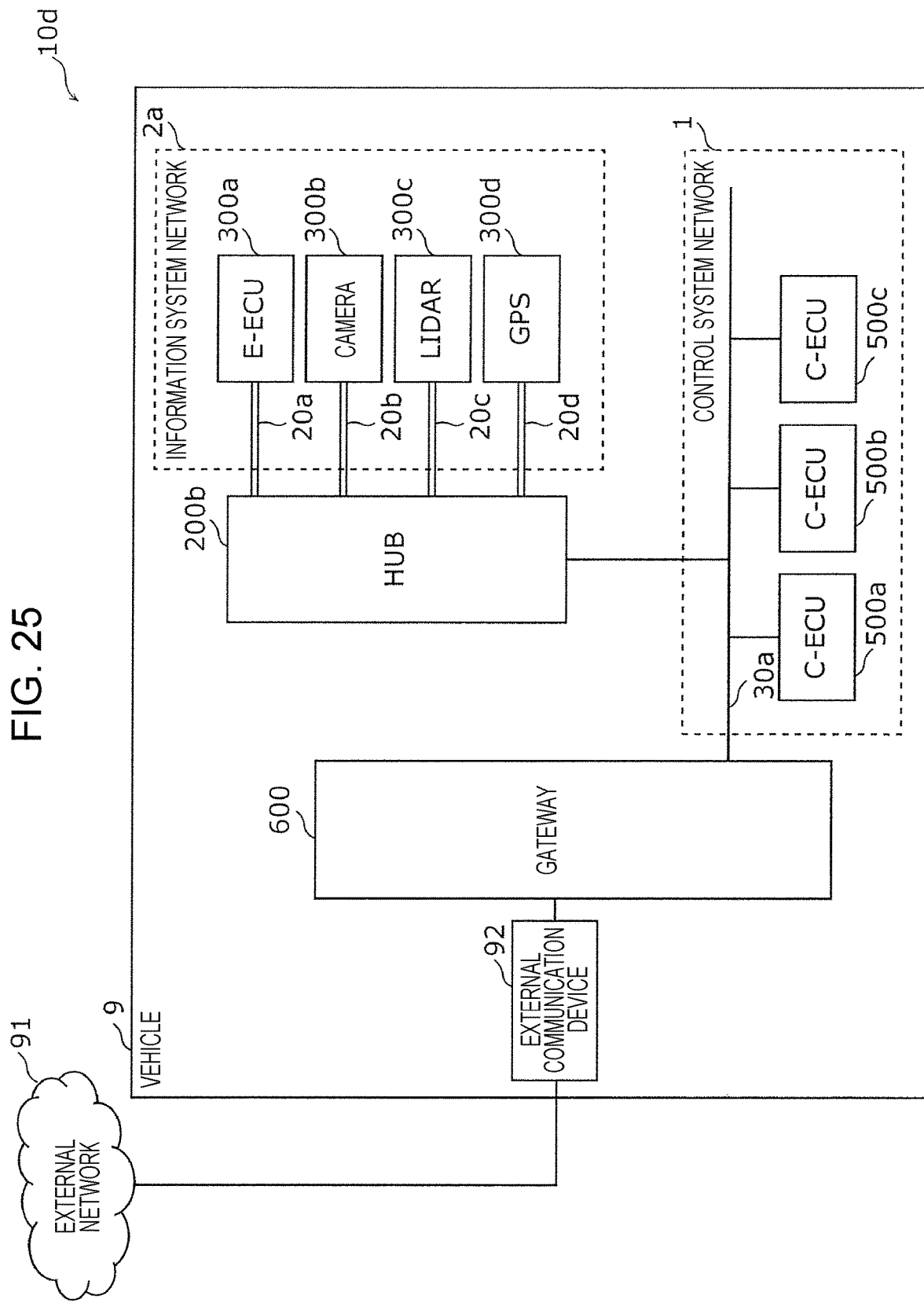
FIG. 25 is a diagram illustrating a schematic configuration of an onboard network system according to a third modification.
Figure 26:
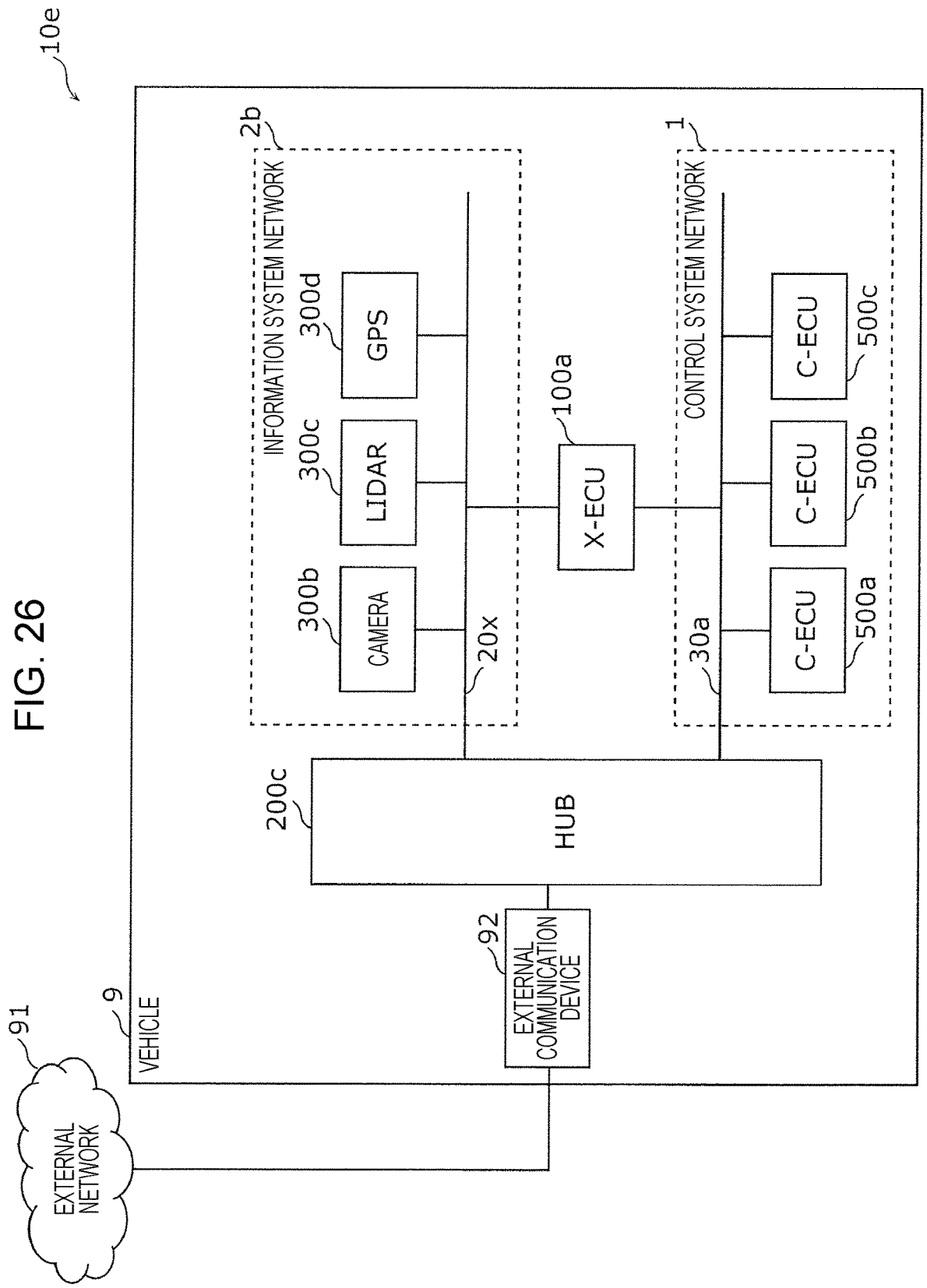
FIG. 26 is a diagram illustrating a schematic configuration of an onboard network system according to a fourth modification.
Figure 27:
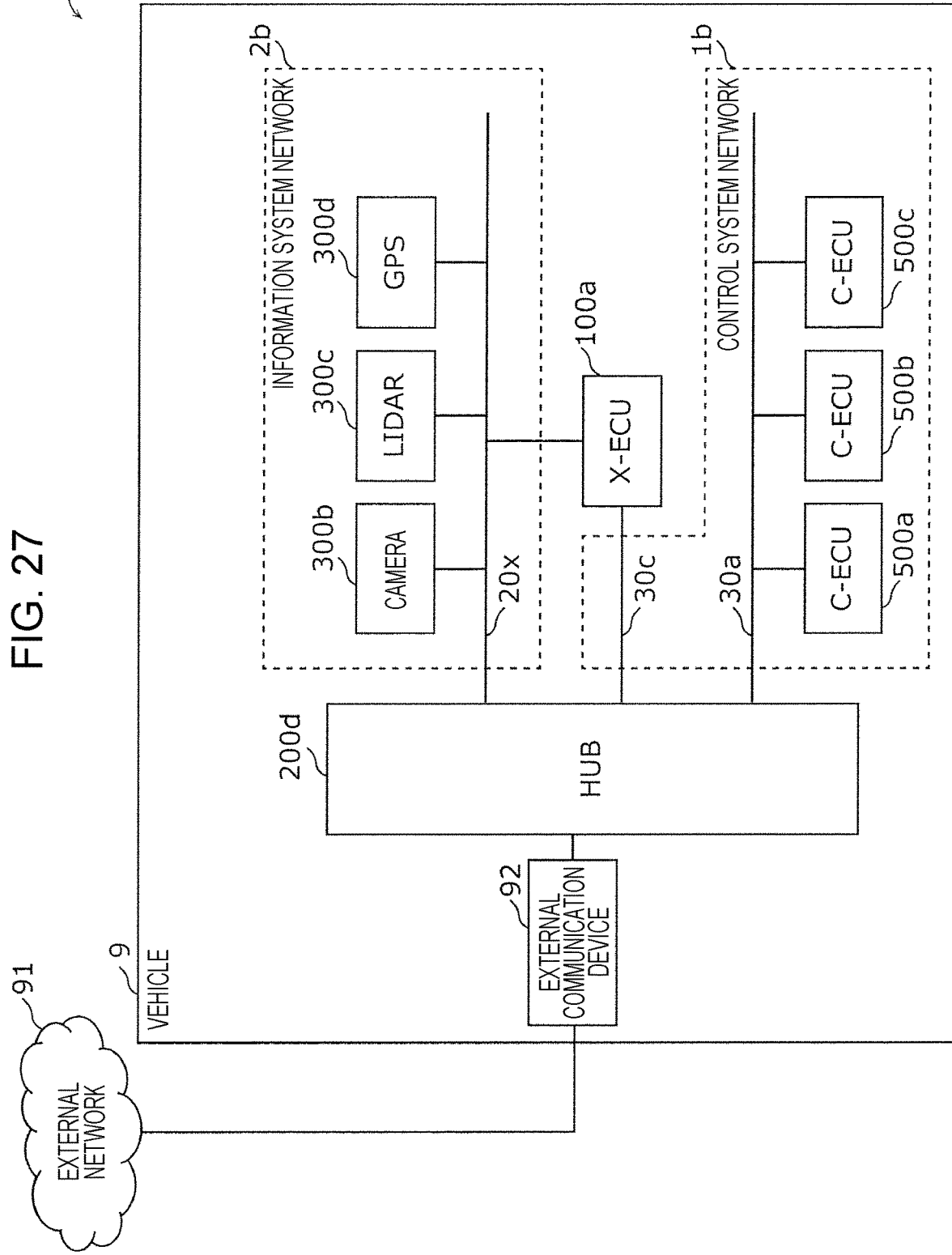
FIG. 27 is a diagram illustrating a schematic configuration of an onboard network system according to a fifth modification.
Figure 28:
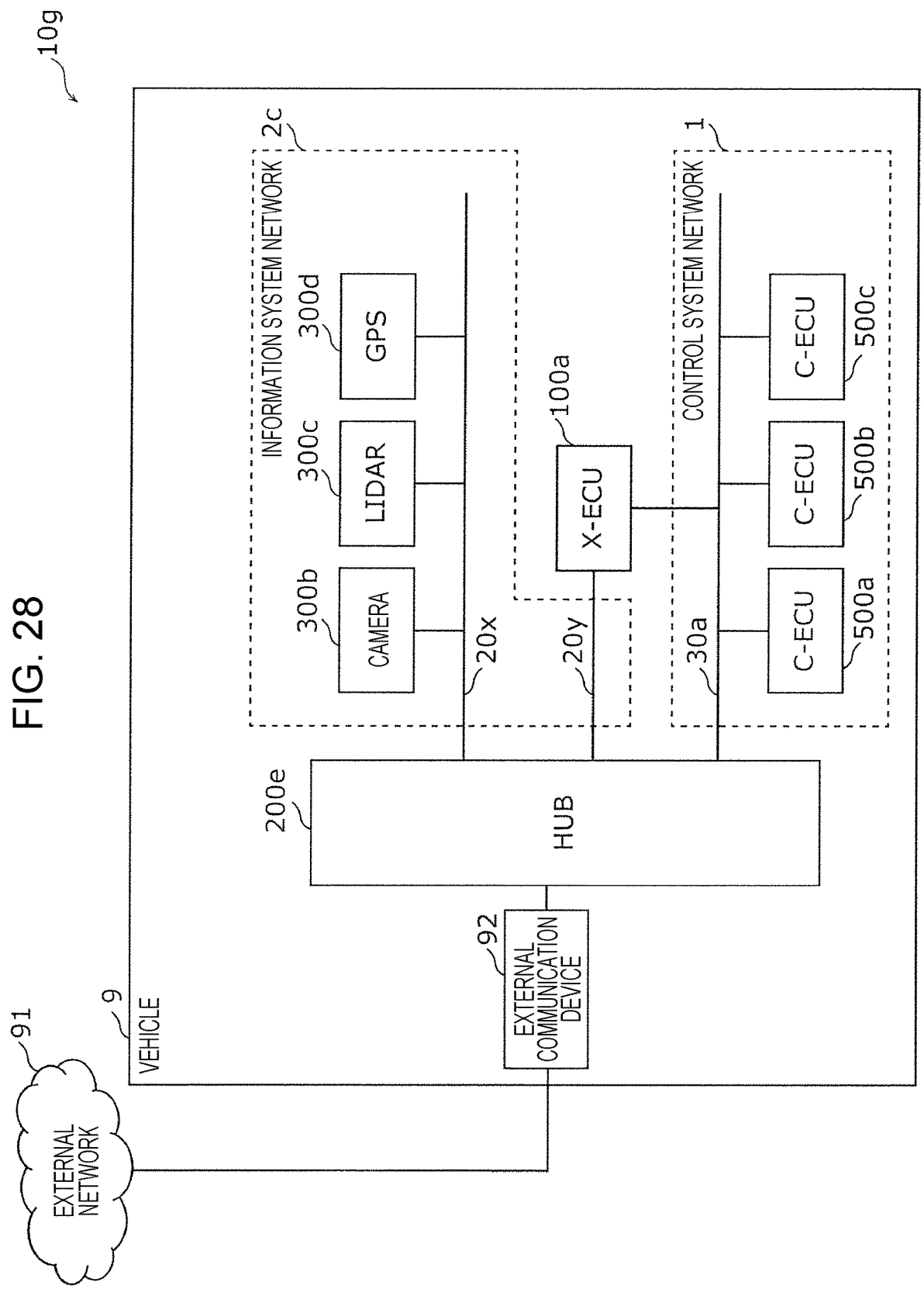
FIG. 28 is a diagram illustrating a schematic configuration of an onboard network system according to a sixth modification.

(1) The configurations of the onboard network systems 10 and 10a illustrated in the above-described embodiments (see FIGS. 2 and 20) are only examples, and any configuration may be made as long as it includes a first network where a first-type frame (e.g., CAN frame) relating to traveling control of a vehicle is transmitted over a bus following a first communication protocol (e.g., CAN protocol) and a second network where a second-type frame (e.g., E-frame) is transmitted following a second communication protocol (e.g., Ethernet (registered trademark) protocol) that is different form the first communication protocol. The configuration of the onboard network system may be such as modifications illustrated in FIGS. 23 through 28 (modifications 1 through 6), for example. The same components are denoted by the same reference symbols in the drawings. An onboard network system 10*b* illustrated in FIG. 23 has a configuration where the X-ECU 100 is omitted from the onboard network system 10. Note that the E-ECU 300*a* may have ADAS functions, for example. The E-ECU 300*a* and C-ECUs 500*a* through 500*c* in the onboard network system 10*b* are capable of exchanging information with each other via the hub 200, even without corresponding to two types of communication protocols as with the X-ECU 100. In an onboard network system 10*c* illustrated in FIG. 24, a gateway 600 does not have an interface compatible with the Ethernet (registered trademark) protocol, and has functions of a CAN gateway that handles transfer of CAN frames between buses (CAN busses) 30*a* and 30*c* serving as transmission paths on a control system network 1*b*. A hub 200*b* has the function of connecting the control system network 1*b* and an information system network 2*a*, and relaying (transferring) data between the networks. The hub 200*b* has ports (connection terminals) connected to multiple Ethernet (registered trademark) cables, and encompasses the same functions as the hub 200 and the E-hub 400 illustrated in the first embodiment. An onboard network system 10*d* illustrated in FIG. 25 primarily is equivalent to an arrangement where the control system network 1*b* in the onboard network system 10*c* has been replaced by the control system network 1 in the onboard network system 10. An onboard network system 10*e* illustrated in FIG. 26 is the onboard network system 10 where the information system network 2 has been replaced by a bus-type information system network 2*b*. A hub 200*c* is connected to the bus 30*a* of the control system network 1 and a bus 20*x* of the information system network 2*b*, and has a function of transferring data between two networks, in the same way as the hub 200. An X-ECU 100*a* has a communication interface that is compatible with both the control system network 1 and the information system network 2*b*, and is connected to the bus 30*a* of the control system network 1 and the bus 20*x* of the information system network 2*b*. The X-ECU 100*a* can receive data from both networks in the same way as the X-ECU 100, and can transmit data to both networks. The X-ECU 100*a* has communication interfaces compatible with both networks, and accordingly can exchange data more speedily than exchanging data with one of the networks via the hub 200*c*. An onboard network system 10*f* illustrated in FIG. 27 is an arrangement where the control system network 1 of the onboard network system 10*e* has been replaced by the control system network 1*b*, and the hub 200*c* has been replaced by a hub 200*d* connected to multiple CAN busses (busses 30*a* and 30*c*) of the control system network 1*b*. The hub 200*d* has the same functions as the hub 200*c*, and functions of a CAN gateway. An onboard network system 10*g* illustrated in FIG. 28 is an arrangement where the information system network 2*b* in the onboard network system 10*e* has been replaced by an information system network 2*c*, and the hub 200*c* has been replaced by a hub 200*e* that connects to multiple busses (busses 20*x* and 20*y*) of the information system network 2*b*. The hub 200*e* encompasses the same functions as the hub 200*c*, and frame relay functions of the information system network 2*c*. Note that the external communication device 92 may be omitted from the above-described onboard network systems, and the devices (sensors, etc.) connected to the transmission path of the information system networks and C-ECUs connected to the transmission path of the control system networks may have any functions. An arrangement may be made where the network hubs (hub) in the onboard network systems, such as the E-hub 400, hub 200*b*, and so forth, do not have functions as an Ethernet (registered trademark) switch (switching hub), and at the time of transmitting E-frames, send out the E-frames onto all Ethernet (registered trademark) cables connected to the hub without distinguishing the destination MAC addresses of the E-frames. The connection state of the information system network (network topology) may be changed in the above-described onboard network systems.

(2) Although the X-ECU 100 has been described in the embodiments above as having ADAS functions, the X-ECU 100 may have other functions instead of having ADAS functions. The generating unit 130 of the X-ECU 100 may add information indicating the degree of priority of transmission to serve as a reference for priority transmission control (e.g., a numerical value indicating the degree of priority, information indicating that priority is to be given, etc.) to data stored in the transmission buffer 140*a* or transmission buffer 140*b*. The transmission unit 150 may perform priority transmission control, such as transmitting earlier the higher the degree of priority is, based on the degree of priority of transmission of data stored in the buffers. The X-ECU 100 may transmit the data with information indicating this degree of priority of transmission added thereto, included in the contents of CAN frames or E-frames, and the hub 200 or the like may reference the degree of priority of transmission and perform control to transfer with priority (e.g., reading out and transmitting earlier the higher the degree of priority of transmission is, etc.), for example. The X-ECU 100 may be connected to each of the control system network and information system network via a device having gateway functions or the like (a relay device such as a hub or the like).

(3) Description has been made in the above embodiments that the onboard network system includes a first network (control system network) and a second network (information system network), with the first network transmitting CAN frames (data frames) over a CAN bus following the CAN protocol, and the second network transmitting E-frames (Ethernet (registered trademark) frames) following the Ethernet (registered trademark) protocol. This CAN protocol is to be understood to have a broad meaning, encompassing derivative protocols such as CANOpen used in embedded systems within automation systems and so forth, TTCAN (Time-Triggered CAN), CANFD (CAN with Flexible Data Rate) and so forth. Data frames in the CAN protocol may be in an extended ID format, besides in the standard ID format. Ethernet (registered trademark) frames may be Ethernet (registered trademark) Version 2 frames, or may be frames stipulated by IEEE 802.3. The Ethernet (registered trademark) protocol may be understood to have a broad meaning, encompassing derivative protocols such as Ethernet (registered trademark) Audio Video Bridging (AVB) relating to IEEE 802.1, Ethernet (registered trademark) Time Sensitive Networking (TSN) relating to IEEE 802.1, Ethernet (registered trademark)/Industrial Protocol (IP), Ethernet (registered trademark) for Control Automation Technology (EtherCAT (registered trademark)), and so forth. An arrangement may be made where the first network transmits first-type frames (e.g., CAN frames or the like) following a first communication protocol, and the second network transmits second-type frames (e.g., E-frames or the like) following a second communication protocol that differs from the first communication protocol. In this case, the first communication protocol is the CAN protocol for example, but is not restricted to the CAN protocol, and may be Local Interconnect Network (LIN), Media Oriented Systems Transport (MOST (registered trademark)), FlexRay (registered trademark), and so forth. Also, the second communication protocol is the Ethernet (registered trademark) protocol for example, but is not restricted to the Ethernet (registered trademark) protocol, and may be a BroadR-Reach protocol, for example. According to the onboard network system having the first network and second network, information transmitted from an ECU or the like connected to the first network (e.g., C-ECU) can be transmitted to an ECU or the like connected to the second network (e.g., an E-ECU), via the above-described hub or the like, and conversely, information transmitted by an ECU or the like connected to the second network can be transmitted to an ECU or the like connected to the first network. Note that the Ethernet (registered trademark) illustrated in the above-described embodiments can transmit a great amount of data per frame as compared to CAN. With regard to this point, the second communication protocol may be various types of protocols that can transmit a great amount of data per frame as compared to the first communication protocol.

(4) The contents of CAN frames and E-frames stored in the reception buffers (reception buffers 120*a*, 120*b*, 220*a*, 220*b*) illustrated in the above-described embodiments are not restricted to data (contents of the data field of CAN frames or contents of the payload of Ethernet (registered trademark) frames), and the contents may include information of any portion of CAN frames or E-frames. Data stored in transmission buffers (transmission buffers 140*a*, 140*b*, 240*a*, 240*b*) may also be data equivalent to the contents of entire CAN frames or E-frames to be transmitted. Thus, even in a case where the contents of entire CAN frames to be transmitted are stored in the transmission buffers, if an abnormality occurs at part of the CAN control system network, the transmission units 150 and 250 can construct E-frames including the contents of the CAN frames in the payload and so forth, and transmit to the information system network.

(5) The order of executing the procedures of various types of processing illustrated in the above-described embodiments (e.g., the procedures illustrated in FIGS. 9 through 19, etc.) is not necessarily restricted to the above-described order, and the order of execution may be switched around, multiple procedures may be executed in parallel, part of the procedures may be omitted, and so forth, without departing from the essence of the disclosure.

(6) Devices in the above-described embodiments, such as hubs, E-hubs, ECUs (E-ECUs, C-ECUs, and X-ECUs), and so forth, may include other hardware components such as a hard disk device, display, keyboard, mouse, and so forth. The functions of the device may be realized through software by programs stored in memory being executed by a processor, or the functions may be realized by dedicated hardware (digital circuits or the like). Assignation of functions among the components within the device is changeable.

(7) The hubs (e.g., hub 200, etc.) illustrated in the above-described embodiments may effect control where data that is read out from a priority reception buffer with priority is immediately transferred, by referencing information indicating the degree of priority relating to reception buffers in priority information, instated of referencing information indicating the degree of priority relating to transmission buffers, for example. That is to say, a hub connected to a bus of a first network and to a second network in an onboard network system that includes the first network where transmission of first-type frames relating to traveling control of a vehicle is performed over a bus following a first communication protocol, and the second network where transmission of second-type frames is performed following a second communication protocol that is different from the first communication protocol, includes a first reception buffer, a second reception buffer, a first reception unit that sequentially receives the first-type frames from the bus and stores data within the first-type frames in the first reception buffer, a second reception unit that sequentially receives the second-type frames from the second network and stores data within the second-type frames in the second reception buffer, a selecting unit that selects whether the destination of data read out from one of the first reception buffer and the second reception buffer is the first network or the second network, and a transmission unit that transmits a frame including this data to the destination when the selecting unit selects the destination of the data, the selecting unit performing priority readout control so as to read out unread data in the priority reception buffer that is one of the first reception buffer and second reception buffer with priority over unread data in the non-priority reception buffer that is the other. According to this hub, transmission of data can be appropriately performed by priority readout control, by appropriately setting the priority reception buffer taking the properties of the first network and the second network each into consideration.

(8) Part or all of the components configuring the devices in the above-described embodiments may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip. While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

(9) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(10) One aspect of the present disclosure may be a communication method or transfer method including all or part of the processing procedures illustrated in FIGS. 9 through 19, for example. For example, the communication method is a method used by an ECU (e.g., X-ECU 100) connected to a bus of a first network and to a second network in an onboard network system that includes the first network where transmission of first-type frames (e.g., CAN frames) relating to traveling control of a vehicle is performed over a bus following a first communication protocol (e.g., CAN), and the second network where transmission of second-type frames (e.g., E-frames) is performed following a second communication protocol (e.g., Ethernet (registered trademark)) that is different from the first communication protocol, the ECU including a first reception buffer (reception buffer 120a), a second reception buffer (reception buffer 120b), a first transmission buffer (transmission buffer 140a), and a second transmission buffer (transmission buffer 140b). The method includes a first reception step of sequentially receiving first-type frames from the bus and storing data within the first-type frames in a first reception buffer (e.g., processing by the reception unit 110a), a second reception step of sequentially receiving second-type frames from the second network and storing data within the second-type frames in a second reception buffer (e.g., processing by the reception unit 110b), a generating step of sequentially generating first-type data (e.g., control system data) that is data for traveling control of the vehicle, and second-type data (information system data) that is data used for other than traveling control of the vehicle, by referencing the contents of the first reception buffer and the second reception buffer, storing the generated first-type data in the first transmission buffer, and storing the generated second-type data in the second transmission buffer (e.g., steps S1 and S2), and a transmission step of transmitting yet-to-be-transmitted first-type data in the first transmission buffer and yet-to-be-transmitted second-type data in the second transmission buffer (e.g., step S3). In the transmission step, priority transmission control is performed where priority type data, which is one of the first-type data and second-type data, is transmitted with priority over non-priority type data that is the other. Also, for example, the transfer method is a method used by a hub (e.g., hub 200, etc.) connected to a bus of a first network and to a second network in an onboard network system that includes the first network where transmission of first-type frames relating to traveling control of a vehicle is performed over a bus following a first communication protocol, and the second network where transmission of second-type frames is performed following a second communication protocol that is different from the first communication protocol, the hub including a first reception buffer (reception buffer 220a), a second reception buffer (reception buffer 220b), a first transmission buffer (transmission buffer 240a), and a second transmission buffer (transmission buffer 240b). The method includes a first reception step of sequentially receiving first-type frames from the bus and storing data within the first-type frames in a first reception buffer (e.g., processing by the reception unit 210a), a second reception step of sequentially receiving second-type frames from the second network and storing data within the second-type frames in a second reception buffer (e.g., processing by the reception unit 210b), a selecting step of selecting the first network or the second network as the destination of the data of that is the contents of one of the first reception buffer and the second reception buffer, storing the data in the first transmission buffer in a case of having selected the first network, and storing the data in the second transmission buffer in a case of having selected the second network (e.g., steps S1 and S4), and a transmission step of transmitting yet-to-be-transmitted data in the first transmission buffer and yet-to-be-transmitted data in the second transmission buffer (e.g., step S3). In the transmission step, priority transmission control is performed where yet-to-be-transmitted data in a priority transmission buffer that is one of the first transmission buffer and the second transmission buffer, is transmitted with priority over yet-to-be-transmitted data in a non-priority transmission buffer that is the other. The method may be a program (computer program) which realizes this method by a computer, or may be digital signals made up of the computer program. An aspect of the present disclosure may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums. An aspect of the present disclosure may be an arrangement where the computer program or the digital signals are transmitted over an electric communication line, wireless or cable communication line, a network of which the Internet is representative, data broadcasting, or the like. Also, an aspect of the present disclosure may be a computer system having a microprocessor and memory, where the memory records the computer program, and the microprocessor operates according to the computer program. The program or the digital signals may be recorded in the recording medium and transported, or the program or the digital signals may be transported over the network or the like, and thereby be executed by another computer system that is independent.

(11) Forms realized by optionally combining the components and functions described in the above embodiments and the above modifications are also included in the scope of the present disclosure.

The present disclosure is applicable to onboard network systems including onboard networks.

What is claimed is:

1. A network hub connected to a bus of a first network and connected to a second network in an onboard network system, the onboard network system including the first network for transmission of first-type frames relating to traveling control of a vehicle over the bus following a first communication protocol, and the second network for transmission of second-type frames following a second communication protocol that is different from the first communication protocol, the network hub comprising:
   a first reception buffer;
   a second reception buffer;
   a first transmission buffer;
   a second transmission buffer;
   a first receiver that sequentially receives the first-type frames from the bus and stores data within the first-type frames in the first reception buffer;
   a second receiver that sequentially receives the second-type frames from the second network and stores data within the second-type frames in the second reception buffer;
   a processor that selects which of the first network and the second network is a destination for data that is a content of one of the first reception buffer and the second reception buffer, stores the data in the first transmission buffer in a case of selecting the first network, and stores the data in the second transmission buffer in a case of selecting the second network; and
   a transmitter that transmits first yet-to-be-transmitted data in the first transmission buffer and second yet-to-be-transmitted data in the second transmission buffer,
   wherein the transmitter performs priority transmission control, where priority yet-to-be-transmitted data in a priority transmission buffer that is one of the first transmission buffer and the second transmission buffer is transmitted with priority over non-priority yet-to-be-transmitted data in a non-priority transmission buffer that is another of the first transmission buffer and the second transmission buffer.

2. The network hub according to claim 1, wherein the priority transmission buffer is the first transmission buffer,
wherein the transmitter performs transmission of the first yet-to-be-transmitted data in the first transmission buffer by sending a first-type frame including the first yet-to-be-transmitted data to the bus of the first network in a case where predetermined exception conditions are not satisfied, and by sending a second-type frame including the second yet-to-be-transmitted data to the second network in a case where the predetermined exception conditions are satisfied,
and wherein the transmitter performs transmission of the second yet-to-be-transmitted data in the second transmission buffer by sending a second-type frame including the second yet-to-be-transmitted data to the second network.

3. The network hub according to claim 2, wherein the predetermined exception conditions are conditions that are satisfied when an abnormality is detected in a part of the first network.

4. The network hub according to claim 1, wherein the transmitter performs the priority transmission control by:
repeatedly confirming the first transmission buffer and the second transmission buffer;
transmitting the priority yet-to-be-transmitted data in the priority transmission buffer in a case where the first yet-to-be-transmitted data is in the first transmission buffer and the second yet-to-be-transmitted data is in the second transmission buffer during the confirming;
transmitting the first yet-to-be-transmitted data in the first transmission buffer in a case where the first yet-to-be-transmitted data is in the first transmission buffer and the second yet-to-be-transmitted data is not in the second transmission buffer during the confirming; and
transmitting the second yet-to-be-transmitted data in the second transmission buffer in a case where the first yet-to-be-transmitted data is not in the first transmission buffer and the second yet-to-be-transmitted data is in the second transmission buffer during the confirming.

5. The network hub according to claim 1, wherein the transmitter performs the priority transmission control by:
repeatedly confirming the first transmission buffer and the second transmission buffer;
transmitting a predetermined quantity of the priority yet-to-be-transmitted data in the priority transmission buffer, and thereafter transmitting one of the non-priority yet-to-be-transmitted data in the non-priority transmission buffer, in a case where the first yet-to-be-transmitted data is in the first transmission buffer and the second yet-to-be-transmitted data is in the second transmission buffer during the confirming;
transmitting the first yet-to-be-transmitted data in the first transmission buffer in a case where the first yet-to-be-transmitted data is in the first transmission buffer and the second yet-to-be-transmitted data is not in the second transmission buffer during the confirming; and
transmitting the second yet-to-be-transmitted data in the second transmission buffer in a case where the first yet-to-be-transmitted data is not in the first transmission buffer and the second yet-to-be-transmitted data is in the second transmission buffer during the confirming.

6. The network hub according to claim 5, wherein the predetermined quantity of the priority yet-to-be-transmitted data transmitted from the priority transmission buffer is a predetermined multiple of the non-priority yet-to-be-transmitted data transmitted from the non-priority transmission buffer.

7. The network hub according to claim 1, wherein the transmitter performs the priority transmission control by:
repeatedly confirming the first transmission buffer and the second transmission buffer;
transmitting the priority yet-to-be-transmitted data in the priority transmission buffer when a non-transmission time of the non-priority yet-to-be-transmitted data in the non-priority transmission buffer does not exceed a predetermined threshold value, and transmitting the non-priority yet-to-be-transmitted data in the non-priority transmission buffer when the non-transmission time exceeds the predetermined threshold value;
transmitting the first yet-to-be-transmitted data in the first transmission buffer in a case where the first yet-to-be-transmitted data is in the first transmission buffer and the second yet-to-be-transmitted data is not in the second transmission buffer during the confirming; and
transmitting the second yet-to-be-transmitted data in the second transmission buffer in a case where the first yet-to-be-transmitted data is not in the first transmission buffer and the second yet-to-be-transmitted data is in the second transmission buffer during the confirming.

8. The network hub according to claim 1, wherein the processor performs priority readout control for selecting which of the first network and the second network is the destination, where content of a priority reception buffer that is one of the first reception buffer and the second reception buffer is read with priority over content of a non-priority reception buffer that is another of the first transmission buffer and the second transmission buffer,
wherein, in a case where the priority transmission buffer is the first transmission buffer, the priority reception buffer is the first reception buffer,
and wherein, in a case where the priority transmission buffer is the second transmission buffer, the priority reception buffer is the second reception buffer.

9. The network hub according to claim 8, wherein the processor performs the priority readout control by:
repeatedly confirming the first reception buffer and the second reception buffer;
reading priority unread data in the priority reception buffer out of the first reception buffer and the second reception buffer in a case where first unread data is in the first reception buffer and second unread data is in the second reception buffer during the confirming;

reading the first unread data in the first reception buffer in a case where the first unread data is in the first reception buffer and the second unread data is not in the second reception buffer during the confirming; and reading the second unread data in the second reception buffer in a case where the first unread data is not in the first reception buffer and the second unread data is in the second reception buffer during the confirming.

10. The network hub according to claim 8,
wherein the processor performs the priority readout control by:
repeatedly confirming the first reception buffer and the second reception buffer;
reading a predetermined quantity of priority unread data in the priority reception buffer out of the first reception buffer and the second reception buffer, and thereafter reading one non-priority unread data in the non-priority reception buffer, in a case where first unread data is in the first reception buffer and second unread data is in the second reception buffer during the confirming;
reading the first unread data in the first reception buffer in a case where the first unread data is in the first reception buffer and the second unread data is not in the second reception buffer during the confirming; and
reading the second unread data in the second reception buffer in a case where the first unread data is not in the first reception buffer and the second unread data is in the second reception buffer during the confirming.

11. The network hub according to claim 10,
wherein the predetermined quantity of the priority unread data is a predetermined multiple of the non-priority unread data.

12. The network hub according to claim 8,
wherein the processor performs the priority readout control by:
repeatedly confirming the first reception buffer and the second reception buffer;
reading priority unread data in the priority reception buffer when a non-readout time of non-priority unread data in the non-priority reception buffer does not exceed a predetermined threshold value, and reading the non-priority unread data in the non-priority reception buffer when the non-readout time exceeds the predetermined threshold value, in a case where first unread data is in the first reception buffer and second unread data is in the second reception buffer during the confirming;
reading the first unread data in the first reception buffer in a case where the first unread data is in the first reception buffer and the second unread data is not in the second reception buffer during the confirming; and
reading the second unread data in the second reception buffer in a case where the first unread data is not in the first reception buffer and the second unread data is in the second reception buffer during the confirming.

13. The network hub according to claim 1,
wherein, in a case where the processor selects the first network as the destination for the data that is the content of the second reception buffer, the data is split into a plurality of data, and the plurality of data is stored in the first transmission buffer.

14. The network hub according to claim 1,
wherein the first communication protocol is the CAN (Controller Area Network) protocol,
wherein the second communication protocol is the Ethernet (registered trademark) protocol,
wherein the first-type frames are data frames,
and wherein the second-type frames are Ethernet (registered trademark) frames.

15. The network hub unit according to claim 1,
wherein a maximum data amount of the second-type frames following the second communication protocol is greater than a maximum data amount of the first-type frames following the first communication protocol.

16. The network hub according to claim 1,
wherein the priority transmission buffer is the first transmission buffer while the vehicle is traveling, and is the second transmission buffer while the vehicle is stopped.

17. A transfer method for a network hub connected to a bus of a first network and connected to a second network in an onboard network system, the onboard network system including the first network for transmission of first-type frames relating to traveling control of a vehicle over the bus following a first communication protocol, and the second network for transmission of second-type frames following a second communication protocol that is different from the first communication protocol, the network hub including a first reception buffer, a second reception buffer, a first transmission buffer, and a second transmission buffer, the transfer method comprising:
sequentially receiving the first-type frames from the bus and storing data within the first-type frames in the first reception buffer;
sequentially receiving the second-type frames from the second network and storing data within the second-type frames in the second reception buffer;
selecting which of the first network and the second network is a destination for data that is a content of one of the first reception buffer and the second reception buffer, storing the data in the first transmission buffer in a case of selecting the first network, and storing the data in the second transmission buffer in a case of selecting the second network; and
transmitting first yet-to-be-transmitted data in the first transmission buffer and second yet-to-be-transmitted data in the second transmission buffer,
wherein, in the transmitting, priority transmission control is performed, where priority yet-to-be-transmitted data in a priority transmission buffer that is one of the first transmission buffer and the second transmission buffer is transmitted with priority over non-priority yet-to-be-transmitted data in a non-priority transmission buffer that is another of the first transmission buffer and the second transmission buffer.

18. An onboard network system comprising:
a first network for transmission of first-type frames relating to traveling control of a vehicle over a bus following a first communication protocol;
a second network for transmission of second-type frames following a second communication protocol that is different from the first communication protocol;
an electronic control unit connected to the bus;
an electronic control unit connected to the second network; and
a network hub connected to the bus and the second network, wherein the network hub includes:
- a first reception buffer;
- a second reception buffer;
- a first transmission buffer;
- a second transmission buffer;
- a first receiver that sequentially receives the first-type frames from the bus and stores data within the first-type frames in the first reception buffer;
- a second receiver that sequentially receives the second-type frames from the second network and stores data within the second-type frames in the second reception buffer;
- a processor that selects which of the first network and the second network is a destination for data that is a content of one of the first reception buffer and the second reception buffer, stores the data in the first transmission buffer in a case of having selected the first network, and stores the data in the second transmission buffer in a case of having selected the second network; and
- a transmitter that transmits first yet-to-be-transmitted data in the first transmission buffer and second yet-to-be-transmitted data in the second transmission buffer, wherein the transmitter performs priority transmission control, where priority yet-to-be-transmitted data in a priority transmission buffer that is one of the first transmission buffer and the second transmission buffer is transmitted with priority over non-priority yet-to-be-transmitted data in a non-priority transmission buffer that is another of the first transmission buffer and the second transmission buffer.

* * * * *